United States Patent
Ferrari et al.

(10) Patent No.: US 8,019,752 B2
(45) Date of Patent: Sep. 13, 2011

(54) SYSTEM AND METHOD FOR INFORMATION RETRIEVAL FROM OBJECT COLLECTIONS WITH COMPLEX INTERRELATIONSHIPS

(75) Inventors: Adam J. Ferrari, Cambridge, MA (US); Frederick C. Knabe, Boston, MA (US); Vinay Seth Mohta, Cambridge, MA (US); Jason Paul Myatt, Melrose, MA (US); Benjamin S. Scarlet, Groton, MA (US); Daniel Tunkelang, Brooklyn, NY (US); John S. Walter, Worcester, MA (US); Joyce Wang, Watertown, MA (US); Michael Tucker, Westwood, MA (US)

(73) Assignee: Endeca Technologies, Inc., Cambridge, MA (US)

( * ) Notice: Subject to any disclaimer, the term of this patent is extended or adjusted under 35 U.S.C. 154(b) by 816 days.

(21) Appl. No.: 11/271,036

(22) Filed: Nov. 10, 2005

(65) Prior Publication Data
US 2007/0106658 A1 May 10, 2007

(51) Int. Cl.
*G06F 17/30* (2006.01)
(52) U.S. Cl. ......... 707/722; 707/706; 707/776; 707/796
(58) Field of Classification Search .................. 707/1, 2, 707/3, 5, 100, 102, 200, 763, 765, 774, 706, 707/722, 776, 796
See application file for complete search history.

(56) References Cited

U.S. PATENT DOCUMENTS

| | | | |
|---|---|---|---|
| 4,775,935 A | 10/1988 | Yourick | |
| 4,868,733 A | 9/1989 | Fujisawa et al. | |
| 4,879,648 A | 11/1989 | Cochran et al. | |
| 4,996,642 A | 2/1991 | Hey | |
| 5,206,949 A | 4/1993 | Cochran et al. | |
| 5,241,671 A | 8/1993 | Reed et al. | |
| 5,418,717 A | 5/1995 | Su et al. | |
| 5,418,948 A | 5/1995 | Turtle | |
| 5,418,951 A | 5/1995 | Damashek | |
| 5,440,742 A | 8/1995 | Schwanke | |
| 5,485,621 A | 1/1996 | Schwanke | |
| 5,544,049 A | 8/1996 | Henderson et al. | |

(Continued)

FOREIGN PATENT DOCUMENTS
EP 0196064 10/1986
(Continued)

OTHER PUBLICATIONS

M Hearst, A Elliott, J English, R Sinha, K Swearingen, K Yee; "Finding the Flow in web Site Search", published Sep. 2002 in "Communications of the ACM", vol. 45, Issue 9, pp. 42-49.*

(Continued)

*Primary Examiner* — Tim T Vo
*Assistant Examiner* — Dangelino Gortayo
(74) *Attorney, Agent, or Firm* — Lando & Anastasi, LLP

(57) ABSTRACT

A data-driven information navigation system and method enable search and analysis of a set of objects or other materials by certain common attributes that characterize the materials, as well as by relationships among the materials. The invention includes several aspects of a data-driven information navigation system that employs this navigation mode. The navigation system of the present invention includes features of a knowledge base, a navigation model that defines and enables computation of a collection of navigation states, a process for computing navigation states that represent incremental refinements relative to a given navigation state, and methods of implementing the preceding features.

36 Claims, 30 Drawing Sheets

U.S. PATENT DOCUMENTS

| | | | |
|---|---|---|---|
| 5,546,576 A | 8/1996 | Cochrane et al. | |
| 5,548,506 A | 8/1996 | Srinivasan | |
| 5,590,269 A | 12/1996 | Kruse et al. | |
| 5,600,829 A | 2/1997 | Tsatalos et al. | |
| 5,630,125 A | 5/1997 | Zellweger | |
| 5,634,128 A | 5/1997 | Messina | |
| 5,644,740 A | 7/1997 | Kiuchi | |
| 5,675,784 A | 10/1997 | Maxwell et al. | |
| 5,696,916 A | 12/1997 | Yamazaki et al. | |
| 5,706,497 A | 1/1998 | Takahashi et al. | |
| 5,715,444 A | 2/1998 | Danish et al. | |
| 5,724,571 A | 3/1998 | Woods | |
| 5,740,425 A | 4/1998 | Povilus | |
| 5,749,081 A | 5/1998 | Whiteis | |
| 5,764,975 A | 6/1998 | Taniguchi et al. | |
| 5,768,578 A | 6/1998 | Kirk et al. | |
| 5,768,581 A | 6/1998 | Cochran | |
| 5,787,422 A | 7/1998 | Tukey et al. | |
| 5,812,998 A | 9/1998 | Tsutsumi et al. | |
| 5,819,273 A | 10/1998 | Vora et al. | |
| 5,835,905 A | 11/1998 | Pirolli et al. | |
| 5,852,822 A | 12/1998 | Srinivasan et al. | |
| 5,864,845 A | 1/1999 | Voorhees et al. | |
| 5,864,846 A | 1/1999 | Voorhees et al. | |
| 5,864,863 A | 1/1999 | Burrows | |
| 5,870,746 A | 2/1999 | Knutson et al. | |
| 5,873,075 A | 2/1999 | Cochrane et al. | |
| 5,875,440 A | 2/1999 | Cooperman et al. | |
| 5,875,446 A | 2/1999 | Brown et al. | |
| 5,878,423 A | 3/1999 | Anderson et al. | |
| 5,893,104 A | 4/1999 | Srinivasan et al. | |
| 5,895,470 A | 4/1999 | Pirolli et al. | |
| 5,897,639 A | 4/1999 | Greef et al. | |
| 5,920,859 A | 7/1999 | Li | |
| 5,924,105 A | 7/1999 | Punch, III et al. | |
| 5,926,811 A | 7/1999 | Miller et al. | |
| 5,940,821 A | 8/1999 | Wical | |
| 5,943,670 A | 8/1999 | Prager | |
| 5,950,189 A | 9/1999 | Cohen et al. | |
| 5,970,489 A | 10/1999 | Jacobson et al. | |
| 5,978,788 A | 11/1999 | Castelli et al. | |
| 5,978,794 A | 11/1999 | Agrawal et al. | |
| 5,978,799 A | 11/1999 | Hirsch | |
| 5,983,219 A | 11/1999 | Danish et al. | |
| 5,983,220 A | 11/1999 | Schmitt | |
| 5,983,223 A | 11/1999 | Perlman | |
| 5,986,655 A | 11/1999 | Chiu et al. | |
| 5,987,468 A | 11/1999 | Singh et al. | |
| 5,987,470 A | 11/1999 | Meyers et al. | |
| 5,991,751 A | 11/1999 | Rivette et al. | |
| 5,991,756 A | 11/1999 | Wu | |
| 6,006,217 A | 12/1999 | Lumsden | |
| 6,006,218 A | 12/1999 | Breese et al. | |
| 6,006,222 A | 12/1999 | Culliss | |
| 6,006,225 A | 12/1999 | Bowman et al. | |
| 6,009,424 A | 12/1999 | Lepage et al. | |
| 6,012,006 A | 1/2000 | Ohneda et al. | |
| 6,012,066 A | 1/2000 | Discount et al. | |
| 6,014,639 A | 1/2000 | Fohn et al. | |
| 6,014,655 A | 1/2000 | Fujiwara et al. | |
| 6,014,657 A | 1/2000 | Weida et al. | |
| 6,014,665 A | 1/2000 | Culliss | |
| 6,028,605 A | 2/2000 | Conrad et al. | |
| 6,029,195 A | 2/2000 | Herz | |
| 6,035,294 A | 3/2000 | Fish | |
| 6,038,560 A | 3/2000 | Wical | |
| 6,038,574 A | 3/2000 | Pitkow et al. | |
| 6,049,797 A | 4/2000 | Guha et al. | |
| 6,070,162 A | 5/2000 | Miyasaka et al. | |
| 6,092,049 A | 7/2000 | Chislenko et al. | |
| 6,094,650 A | 7/2000 | Stoffel et al. | |
| 6,112,186 A | 8/2000 | Bergh et al. | |
| 6,144,958 A | 11/2000 | Ortega et al. | |
| 6,167,368 A | 12/2000 | Wacholder | |
| 6,167,397 A | 12/2000 | Jacobson et al. | |
| 6,212,517 B1 | 4/2001 | Sato et al. | |
| 6,226,745 B1 | 5/2001 | Wiederhold | |
| 6,236,985 B1 | 5/2001 | Aggarwal et al. | |
| 6,236,987 B1 | 5/2001 | Horowitz et al. | |
| 6,240,378 B1 | 5/2001 | Imanaka et al. | |
| 6,240,409 B1 | 5/2001 | Aiken | |
| 6,243,713 B1 | 6/2001 | Nelson et al. | |
| 6,260,008 B1 | 7/2001 | Sanfilippo | |
| 6,263,334 B1 | 7/2001 | Fayyad et al. | |
| 6,266,199 B1 | 7/2001 | Gillis et al. | |
| 6,266,649 B1 | 7/2001 | Linden et al. | |
| 6,269,368 B1 | 7/2001 | Diamond | |
| 6,272,507 B1 | 8/2001 | Pirolli et al. | |
| 6,289,354 B1 | 9/2001 | Aggarwal et al. | |
| 6,301,577 B1 | 10/2001 | Matsumoto et al. | |
| 6,317,741 B1 | 11/2001 | Burrows | |
| 6,339,767 B1 | 1/2002 | Rivette et al. | |
| 6,345,273 B1 * | 2/2002 | Cochran | 707/4 |
| 6,356,899 B1 | 3/2002 | Chakrabarti et al. | |
| 6,360,227 B1 | 3/2002 | Aggarwal et al. | |
| 6,385,602 B1 * | 5/2002 | Tso et al. | 707/3 |
| 6,397,221 B1 | 5/2002 | Greef et al. | |
| 6,418,429 B1 | 7/2002 | Borovoy et al. | |
| 6,424,971 B1 | 7/2002 | Kreulen et al. | |
| 6,424,983 B1 | 7/2002 | Schabes et al. | |
| 6,429,984 B1 | 8/2002 | Alex | |
| 6,446,068 B1 | 9/2002 | Kortge | |
| 6,453,315 B1 | 9/2002 | Weissman et al. | |
| 6,460,034 B1 | 10/2002 | Wical | |
| 6,466,918 B1 | 10/2002 | Spiegel et al. | |
| 6,480,843 B2 | 11/2002 | Li | |
| 6,483,523 B1 | 11/2002 | Feng | |
| 6,490,111 B1 | 12/2002 | Sacks | |
| 6,505,197 B1 | 1/2003 | Sundaresan et al. | |
| 6,507,840 B1 | 1/2003 | Ioannidis | |
| 6,519,618 B1 | 2/2003 | Snyder | |
| 6,539,376 B1 | 3/2003 | Sundaresan et al. | |
| 6,553,367 B2 * | 4/2003 | Horovitz et al. | 707/2 |
| 6,560,597 B1 | 5/2003 | Dhillon et al. | |
| 6,563,521 B1 | 5/2003 | Perttunen | |
| 6,571,282 B1 | 5/2003 | Bowman-Amuah | |
| 6,606,619 B2 * | 8/2003 | Ortega et al. | 707/2 |
| 6,611,825 B1 | 8/2003 | Billheimer et al. | |
| 6,618,697 B1 | 9/2003 | Kantrowitz et al. | |
| 6,628,466 B2 | 9/2003 | Alex | |
| 6,633,316 B1 | 10/2003 | Maddalozzo, Jr. et al. | |
| 6,633,860 B1 | 10/2003 | Afek et al. | |
| 6,633,868 B1 | 10/2003 | Min et al. | |
| 6,647,391 B1 | 11/2003 | Smith et al. | |
| 6,651,058 B1 | 11/2003 | Sundaresan et al. | |
| 6,697,801 B1 | 2/2004 | Eldredge et al. | |
| 6,697,998 B1 | 2/2004 | Damerau et al. | |
| 6,701,311 B2 * | 3/2004 | Biebesheimer et al. | 707/999.003 |
| 6,711,585 B1 | 3/2004 | Copperman et al. | |
| 6,735,578 B2 | 5/2004 | Shetty et al. | |
| 6,748,371 B1 | 6/2004 | Levanoni et al. | |
| 6,763,349 B1 | 7/2004 | Sacco | |
| 6,763,351 B1 | 7/2004 | Subramaniam et al. | |
| 6,778,995 B1 | 8/2004 | Gallivan | |
| 6,845,354 B1 | 1/2005 | Kuo et al. | |
| 6,853,982 B2 | 2/2005 | Smith et al. | |
| 6,868,411 B2 | 3/2005 | Shanahan | |
| 6,928,434 B1 | 8/2005 | Choi et al. | |
| 6,947,930 B2 | 9/2005 | Anick et al. | |
| 6,961,731 B2 * | 11/2005 | Holbrook | 707/999.102 |
| 6,978,274 B1 | 12/2005 | Gallivan et al. | |
| 7,035,864 B1 | 4/2006 | Ferrari et al. | |
| 7,062,483 B2 | 6/2006 | Ferrari et al. | |
| 7,072,902 B2 | 7/2006 | Kleinberger et al. | |
| 7,080,059 B1 * | 7/2006 | Poston et al. | 707/769 |
| 7,085,771 B2 | 8/2006 | Chung et al. | |
| 7,092,936 B1 | 8/2006 | Alonso et al. | |
| 7,093,200 B2 | 8/2006 | Schreiber et al. | |
| 7,099,885 B2 | 8/2006 | Hellman et al. | |
| 7,146,362 B2 * | 12/2006 | Allen et al. | 707/999.005 |
| 7,149,732 B2 | 12/2006 | Wen et al. | |
| 7,325,201 B2 | 1/2008 | Ferrari | |
| 7,366,721 B1 * | 4/2008 | Bennett et al. | 707/10 |
| 7,389,241 B1 * | 6/2008 | Bascom | 705/1 |
| 7,428,528 B1 | 9/2008 | Ferrari | |

| | | | |
|---|---|---|---|
| 7,502,810 B2 * | 3/2009 | Acevedo-Aviles et al. | 707/999.102 |
| 7,567,957 B2 | 7/2009 | Ferrari | |
| 7,596,581 B2 * | 9/2009 | Frank et al. | 707/999.101 |
| 7,617,184 B2 | 11/2009 | Ferrari | |
| 7,788,274 B1 * | 8/2010 | Ionescu | 707/763 |
| 7,856,434 B2 | 12/2010 | Peregrine | |
| 7,912,823 B2 | 3/2011 | Ferrari | |
| 2001/0044758 A1 | 11/2001 | Talib et al. | |
| 2001/0044837 A1 | 11/2001 | Talib et al. | |
| 2001/0047353 A1 | 11/2001 | Talib et al. | |
| 2001/0049674 A1 | 12/2001 | Talib et al. | |
| 2001/0049677 A1 | 12/2001 | Talib et al. | |
| 2002/0051020 A1 | 5/2002 | Ferrari et al. | |
| 2002/0065857 A1 | 5/2002 | Michalewicz et al. | |
| 2002/0083039 A1 | 6/2002 | Ferrari et al. | |
| 2002/0091696 A1 | 7/2002 | Craft et al. | |
| 2002/0095405 A1 | 7/2002 | Fujiwara | |
| 2002/0099675 A1 | 7/2002 | Agrafiotis et al. | |
| 2002/0147703 A1 | 10/2002 | Yu et al. | |
| 2002/0152204 A1 | 10/2002 | Ortega et al. | |
| 2003/0078686 A1 | 4/2003 | Ma et al. | |
| 2003/0101187 A1 | 5/2003 | Gaussier et al. | |
| 2003/0110181 A1 | 6/2003 | Schuetze et al. | |
| 2003/0120630 A1 | 6/2003 | Tunkelang | |
| 2003/0217335 A1 | 11/2003 | Chung et al. | |
| 2004/0006737 A1 | 1/2004 | Kawatani | |
| 2004/0117366 A1 | 6/2004 | Ferrari et al. | |
| 2004/0205448 A1 | 10/2004 | Grefenstette et al. | |
| 2004/0220907 A1 | 11/2004 | Camarillo | |
| 2004/0243554 A1 | 12/2004 | Broder et al. | |
| 2004/0243557 A1 | 12/2004 | Broder et al. | |
| 2005/0022114 A1 | 1/2005 | Shanahan et al. | |
| 2005/0097088 A1 | 5/2005 | Bennett et al. | |
| 2005/0108212 A1 | 5/2005 | Karimisetty et al. | |
| 2005/0165780 A1 | 7/2005 | Omega et al. | |
| 2005/0210042 A1 | 9/2005 | Goedken | |
| 2006/0026152 A1 | 2/2006 | Zeng | |
| 2006/0031215 A1 | 2/2006 | Pong | |
| 2006/0224581 A1 | 10/2006 | Sasai | |
| 2006/0242139 A1 | 10/2006 | Butterfield | |
| 2006/0248074 A1 | 11/2006 | Carmel | |
| 2007/0106658 A1 | 5/2007 | Ferrari | |
| 2007/0294225 A1 | 12/2007 | Radlinski et al. | |
| 2008/0104032 A1 * | 5/2008 | Sarkar | 707/3 |
| 2008/0133479 A1 | 6/2008 | Zelevinsky | |
| 2008/0154878 A1 | 6/2008 | Rose et al. | |
| 2009/0006382 A1 | 1/2009 | Tunkelang | |
| 2009/0006383 A1 | 1/2009 | Tunkelang | |
| 2009/0006384 A1 | 1/2009 | Tunkelang | |
| 2009/0006385 A1 | 1/2009 | Tunkelang | |
| 2009/0006386 A1 | 1/2009 | Tunkelang | |
| 2009/0006387 A1 | 1/2009 | Tunkelang | |
| 2009/0006438 A1 | 1/2009 | Tunkelang | |

FOREIGN PATENT DOCUMENTS

| | | |
|---|---|---|
| EP | 0597630 | 5/1994 |
| EP | 0676705 | 10/1995 |
| EP | 0694829 | 1/1996 |
| EP | 0795833 | 9/1997 |
| EP | 0827063 | 3/1998 |
| EP | 0918295 | 5/1999 |
| EP | 1050830 | 11/2000 |
| EP | 0 694 829 B1 | 5/2002 |
| GB | 2293667 | 4/1996 |
| GB | 2297179 | 7/1996 |
| JP | 09034901 | 2/1997 |
| JP | 10134063 | 5/1998 |
| JP | 11250107 | 9/1999 |
| JP | 11296547 | 10/1999 |
| WO | 90/04231 | 4/1990 |
| WO | 96/27161 | 9/1996 |
| WO | 97/36251 | 10/1997 |
| WO | 98/20436 | 5/1998 |
| WO | WO-00/36529 | 6/2000 |
| WO | WO00/42533 | 7/2000 |
| WO | 01/67225 | 9/2001 |
| WO | WO-01/67300 | 9/2001 |
| WO | WO-02/097671 A2 | 12/2002 |
| WO | WO-03/027902 | 4/2003 |

OTHER PUBLICATIONS

Beaudoin et al., "Cheops: A Compact Explorer for Complex Hierarchies", IEEE, pp. 87-92 (1996).

Bird et al., "Content-Driven Navigation of Large Databases", The Institution of Electrical Engineers, 1996, pp. 13/1-13/5.

Carey, M. et al., "Info Navigator: A Visualization Tool for Document Searching and Browsing", Proceedings International Conference Distributed Multmedia Systems, pp. 23-28, (DMS Sep. 2003), 2003.

Chen et al., "Internet Browsing and Searching: User Evaluations of Category Map and Concept Space Techniques", Wiley InterScience: Journal:Abstract, Jan. 6, 1999.

Chen et al., "Internet Browsing and Searching: User Evaluations of Category Map and Concept Space Techniques," Journal of the American Society for Information Science, vol. 49, pp. 582-603 (1998).

Chen et al., "Object Signatures for Supporting Efficient Navigation in Object-Oriented Databases", Proceeding of the 32nd Hawaii International Conference on System Sciences, IEEE, pp. 502-507 (1997).

Chen et al., "Online Query Refinement on Information Retrieval Systems" A Process Model of Searcher/System Interactions, MID Department, University of Arizona, pp. 115-133 (1990).

Cilibrasi, R. et al., "Automatic Meaning Discovery Using Google", 31 Pages, www.bsik-bricks.nl/events/ab/google_abstract.shtml, www.arxiv.org/abs/cs.CL0412098, (2004).

Ellis, GP et al., "HIBROWSE for Hotels: bridging the gap between user and system views of a database", extracts from a paper giving an overview of the HIBROWSE for Hotels application, http://web.archive.org/web/19991109234626/http//www.hud.ac.uk/schoo...4 pages.

European Search Authority, European Search Report for European Application No. 02773183.5 mailed Oct. 15, 2007.

European Search Authority, European Search Report for European Patent Application No. 01945997.3, dated May 23, 2007, 6 pages.

Fua et al., "Structure-Based Brushes: A Mechanism for Navigating Hierarchically Organized Data and Information Spaces", IEEE Transactions on Visualization and Computer Graphics, vol. 6, No. 2, pp. 150-159, Apr.-Jun. 2000.

Gil et al., "A Visual Interface and Navigator for the P/FDM Object Database", Department of Computing Science, University of Aberdeen, IEEE, pp. 54-63 (1999).

Han et al., "Join Index Hierarchy: An Indexing Structure for Efficient Navigation in Object-Oriented Databases", IEEE Transactions on Knowledge and Data Engineering, vol. 11, No. 2, pp. 321-337, Mar./Apr. 1999.

Hearst'S Fall 1999 Course, SIMS 202 Information Organization and Retrieval: http://www2.sims.berkeley.edu/courses/is202/f99/Lectures.html.

Hearst, M. et al., "Integrating Browsing & Search Relevance Feedback", SIMS 202, UC Berkeley, SIMS, Fall 1999, 2 pages.

Hearst, M. et al., "Using MetaData in Search: Combining Browsing and Search", UCB SIMS, SIMS 202 Fall 98, Lecture 27, pp. 1-39 http://www2.sims.berkeley.edu./courses.is202/f98/Lecture27/sld001.htm.

Hearst, M., "Chapter 10: User Interfaces and Visualization", Modern Information Retrieval, Yates and Ribeiro-Neto, (1999), pp. 257-340.

http://www.searchtools.com/tools/endeca.html, Search Tools Product Report, "Endeca Faceted Metadata Search and Browse", 2 pages, updated Jul. 10, 2993.

Hua et al., "Object Skeletons: An Efficient Navigation Structure for Object-Oriented Database Systems", IEEE, pp. 508-517 (1994).

International Searching Authority, International Search Report for PCT/03/31770, mailed Jun. 29, 2004.

Kummamuru et al., "A Hierarchical Monothetic Document Clustering Algorithm for Summarization and Browsing Search Results", WWW2004, pp. 658-665, May 17-22, 2004.

McEneaney, John E., "Visualizing and Assessing Navigation in Hypertext", Hypertext 99, Darmstadt Germany, pp. 61-70 (1999).

Miller, Renee J., "Using Schematically Heterogeneous Structures", Department of Computer and Information Science, Ohio State University, 1998, p. 189-200.

Mills, J., "The Problem of arrangement in a Library", A Modern Outline of Library Classification, Chapman & Hall Ltd, pp. 1-8, 1960.

Pollitt A.S., "Intelligent Interfaces to online Databases", Expert Systems for Information Management, vol. 3, No. 1, pp. 49-69, 1990.

Pollitt et al., "Faceted-Classification as Pre-Coordinated Subject Indexing: Multi-Dimensional Searching for OPAC Users", Oslo College, May 6-7, 1998.

Pollitt et al., "MenUse for Medicine: End-User Browsing and Searching of MEDLINE via the MeSH Thesaurus", Int. Forum Inf. and Docum., pp. 547-573, 1988.

Pollitt et al., "MenUse for Medicine: End-User Browsing and Searching of MEDLINE via the MeSH Thesaurus", Int. Forum Inf. and Docum., vol. 13, No. 4, pp. 11-17, Oct. 1998.

Pollitt et al., "Multilingual access to document databases", CAIS/ACSI '93 Information as a Global Commodity—Communication, Processing and Use, Proceedings of the 21st Annual Conference of the Canadian Association for Information Science, pp. 128-140, Antigonish, Nova Scotia Canada, Jul. 1993.

Pollitt, A.S., "A rule-based system as an intermediary for searching cancer therapy literature on MEDLINE", Intelligent Information Systems: Progress and Prospects, pp. 82-126, 1986.

Pollitt, A.S., "An Expert Systems Approach to Document Retrieval, A thesis submitted to the Council for National Academic Awards in partial fulfillment of the requirements for the degree Doctor of Philosophy", May 1986.

Pollitt, A.S., "Expert Systems and the Information Intermediary: Tackling Some of the Problems of Naive End-User Search Specification and Formulation", Intelligent Information Systems for the Information Society, pp. 100-108, 1986.

Pollitt, A.S., Information Storage and Retrieval Systems, Origin, Development and Applications, Ellis Horwood Books in Information Technology, 1989.

Pollitt, A.S., "Reducing complexity by rejecting the consultation model as a basis for the design of expert systems", Expert Systems, vol. 3, No. 4, pp. 234-238, Oct. 1986.

Pollitt, A.S., "Taking a different view", British Library research, Library Technology, vol. 1, Nov. 1, 1996.

Pollitt, A.S., "The key role of classification and indexing in view-based searching", Centre for Database Access Research, University of Huddersfield, UK, Abstract, 8 pages.

Pollitt, S., "CanSearch: An Expert Systems Approach to Document Retrieval", Information Processing & Management, vol. 23, No. 2, pp. 119-138, (1987).

Priss, U. et al., "Utilizing Faceted Structures for Information Systems Design", School of Library and Information Science, Indiana University Bloomington, pp. 1-12.

Ramaswami et al., "Navigating a Protection-Engineering Data Base", IEEE, pp. 27-32, Apr. 1989.

Screenshots from "View-based searching with HIBROWSE", http://www.jbi.hio.no/bibin/kurs/korg98/oslo2.ppt, 10 pages.

Treglown, M. et al., "HIBROWSE for Bibliographic Databases: A study of the application of usability techniques in view-based searching", British Library Research and Innovation Report 52, The University of Huddersfield, Apr. 1997.

Tu et al., "Agent Technology for Website Browsing and Navigation", Proceedings of the 32nd Hawaii International Conference on Systems Sciences, IEEE, pp. 1-10, 1999.

Turine et al., "A Navigation-Oriented Hypertext Model Based on Statecharts", Hypertext 97, Southampton UK, 1997.

Velez et al., "Fast and Effective Query Refinement", SIGIR 1997, pp. 6-15.

Weiland et al., "A graphical query interface based on aggregation/generalization hierarchies," Information systems, vol. 18, No. 4, pp. 215-232 (1993).

Xiong et al., "Taper: A Two-Step Approach for All-Strong-Pairs Correlation Query in Large Databases", IEEE Transactions on Knowledge and Data Engineering, vol. 18, No. 4, Apr. 2006, pp. 493-508.

Yoo et al., "Towards a Relationship Navigation Analysis", Proceedings of the 32nd Hawaii International Conference on System Sciences, IEEE, pp. 1-10, (2000).

Agosti, M., et al. "Issues of Data Modelling in Information Retrieval" Electronic Publishing, (1991), vol. 4(4) pp. 219-237.

Allen, R.B., "Retrieval From Facet Spaces" Electronic Publishing (1995), vol. 8(2&3), pp. 247-257.

Allen, R.B., "Two Digital Library Interfaces That Exploit Hierarchical Structure" Electronic Publishing (1995) 8 pages.

Amato, et al., "Region proximity in metric spaces and its use for approximate similarity search", ACM Trans. In. System, (2003), vol. 21(2), pp. 192-227.

Baeza-Yates, et al., "New Approaches to Information Management: Attribute-Centric Data Systems" Proceedings Seventh International Symposium on String Processing and Information Retrieval, (2000), pp. 17-27.

Bergstrom, "A family of delphi components for case-based reasoning", Proceedings 11th IEEE International Conference on Chicago, (1999), pp. 153-160.

Beyer et al., "When is 'Nearest Neighbor' meaningful", Proceedings of the 7th International Conference on Database Theory, (1999).

Diamantini et al., "A conceptual indexing method for content-based retrieval", Database and Expert Systems Applications. Proceedings Tenth Workshop on Florence Italy, (1999), pp. 192-197.

Guha et al., "ROCK: A robust clustering algorithm for categorical attributes", Data Engineering Proceedings 15th International Conference on Sidney, (1999), pp. 512-521.

Guttman, "R-Trees: A dynamic index structure for spatial searching", Proceedings of the ACM SIG-MOD Conference, (1984).

Han-Joon, K. et al., "An effective document clustering method using user-adaptable distance metrics.", SAC, (2002), 16-20.

Hearst, M., et al. "Cat-a Cone: An Interactive Interface for Specifying Searches and Viewing Retrieval Results Using a Large Catergory Hierarchy" Ann. Int. ACM-SIGIR Conf. on Res. and Dev. in Information Retrieval, (1997) pp. 246-255.

Hinneburg et al., "What is the nearest neighbor in high dimensional spaces", Proceedings of the 26th VLDB Conference, (2000).

Hongyan Jing, "Information retrieval based on context distance and morphology", Proceedings of the 22nd annual international ACM SIGIR conference on Research and Development in information retrieval, pp. 90-96, Aug. 1999.

Miller et al., "DataWeb: Customizable Database Publishing for the Web" IEEE Multimedia, 4(4):14-21(1997).

Miller et al., "Integrating Hierarchical Navigation and Querying: A User Customizable Solution" ACM Multimedia Workshop on Effective Abstractions in Multimedia Layout, Presentation, and Interaction, San Francisco, CA, Nov. 1995.

Pedersen, G.S., "A Browser For Bibliographic Information Retrieval Based On An Application of Lattice Theory" Proc. Of the Ann. Int. SCM SIGIR Conference on Res. And Deve. In Information Retrieval, (1993), pp. 270-279.

Pi-Sheng, "Using case-based reasoning for decision support", Proceedings of the 27th Annual Hawaii International Conference on System Sciences, (1994), pp. 552-561.

Pollitt, et al. "HIBROWSE for Bibliographic Databases" Journal of Information Science, (1994), vol. 20 (6), pp. 413-426.

Pollitt, et al. "View-Based Searching Systems—Progress Towards Effective Disintermediation" Online Information Meeting Proceedings, (1996) pp. 433-445.

PriceSCAN.com, Your Unbiased Guide to the Lowest Price on Books, Computers, Electronic . . . ,Copyright 1997-1999, <http://web.archive.org/web/19991117123352/http://www.pricescan.com/>, pp. 1-8.

Salton et al., "Term-weighting approaches in automatic test retrieval", Information Processing & Management, (1988), vol. 24(5), pp. 513-523.

Shamos et al., "Closest-point problems", Proceedings of the 16th Annual Symposium on Foundations of Computer Science, IEEE (1975).

Story, G.A., et al., "The RightPages Image-Based Electronic Library for Alerting and Browsing" Computer, (1992), vol. 25(9), pp. 17-25.

Yahoo 1996 (Exhibit 12-16).

Yahoo!, Copyright 1999 Yahoo! Inc., <http://web.archive.org/web/19991116151216/http://www4.yahoo.com/>.

Garcia-Molina, H. et al., "Database system implementation", Prentice Hall, Upper Saddle River, New Jersey, 2000, XP002423997, pp. 329-364.

International Searching Authority, International Search Report for PCT/US2006/043538, date of mailing Mar. 26, 2007, 12 pages.

George Koch and Kevin Loney, "Oracle 8, the Complete Reference," Osborne McGrawHill, p. 68 (1997).

International Search Report and Written Opinion for International Patent Application No. PCT/US07/86150, mailed Jul. 23, 2008.

Final Office action mailed on Jan. 7, 2009 for U.S. Appl. No. 11/268,868, filed Nov. 8, 2005.

Non Final Office action mailed Feb. 21, 2008 for U.S. Appl. No. 09/961,131, filed Sep. 21, 2001.

Non Final Office Action mailed on Apr. 15, 2008 for U.S. Appl. No. 11/268,868, filed Nov. 8, 2005.

Non final Office Action mailed on Jul. 23, 2008 for U.S. Appl. No. 11/408,797, filed Apr. 20, 2006.

Yahoo Inc., Yahoo!, copyright 1999, http://web.archive.org/web/19991013122821/http://www.yahho.com/, 22 pages.

Office Action Mailed on Jun. 3, 2008 for U.S. Appl. No. 11/606,469 filed on Nov. 30, 2006.

Office Action Mailed on Aug. 31, 2009 for U.S. Appl. No. 11/606,469 filed on Nov. 30, 2006.

Office Action Mailed on May 17, 2010 for U.S. Appl. No. 11/606,469 filed on Nov. 30, 2006.

Office Action Mailed on Apr. 2, 2009 for U.S. Appl. No. 11/606,469 filed on Nov. 30, 2006.

Anton V. Leouski et al., "An Evaluation of Techniques for Clustering Search Results," Computer Science Department, University of Massachusetts at Amherst, MA, pp. 1-19, Internet Citation (1996), retrieved on Mar. 7, 2007.

Hua-Jun Zeng et al., "Learning to Cluster Web Search Results," Int'l ACM SIGIR Cont. on Research & Development in Information Retrieval, Jul. 25-29, 2004 pp. 210-217.

Oren Zamir et al., "Grouper: A Dynamic Clustering Interface to Web Search Results," Comp Networks and ISDN Systems, May 11, 1999, p. 1361-1374, V. 31, No. 11-16.

Ak Jain et al., "Data Clustering: A Review," ACM Computing Surveys, Sep. 1999, p. 264-323, V. 21, No. 3.

Pollitt, A Steven, Smith, Martin P., And Braekevelt, Patrick A.J., View-Based searching systems: A new paradigm for information retrieval based on faceted classification and indexing using mutually constraining knowledge-based rules, The Interface Design downloaded on Jun. 9, 2006.

* cited by examiner

Figure 2A

210
Type: Book
Title: Algorithmic and Computational Robotics
Subject: Computer Science
Publication Year: 2001
Author: Daniela Rus
Author: Bruce Randall Donald Type: Person
Name: Daniela Rus
Nationality: Romanian
Gender: Female
220

Type: Book
Title: Symbolic and Numerical Computation
Subject: Computer Science
Publication Year: 1992
Author: Bruce Randall Donald Type: Person
Name: Bruce Randall Donald
Nationality: American
Gender: Male

Figure 2B

240
Type: Book
Title: Algorithmic and Computational Robotics
Subject: Computer Science
Publication Year: 2001
Author: Daniela Rus
Author: Bruce Randall Donald
Author Nationality: Romanian
Author Nationality: American
Author Gender: Female
Author Gender: Male Type: Book
Title: Symbolic and Numerical Computation
Subject: Computer Science
Publication Year: 1992
Author: Bruce Randall Donald
Author Nationality: American
Author Gender: Male
230

Figure 2C

250
Type: Book
Title: Algorithmic and Computational Robotics
Subject: Computer Science
Publication Year: 2001
Author: Daniela Rus
Author Nationality: Romanian
Author Gender: Female 260
Type: Book
Title: Algorithmic and Computational Robotics
Subject: Computer Science
Publication Year: 2001
Author: Bruce Randall Donald
Author Nationality: American
Author Gender: Male Type: Book
Title: Symbolic and Numerical Computation
Subject: Computer Science
Publication Year: 1992
Author: Bruce Randall Donald
Author Nationality: American
Author Gender: Male Navigation State A Navigation State B1

Navigation State B2

Navigation State B3

Navigation State D2

Navigation State E

Navigation State F

Navigation State G

Navigation State H

Navigation State O

Navigation State P

Figure 37

| Books | Search Results |
|---|---|
| Subject<br>Publisher<br>Author<br>   Nationality<br>   Gender<br>   Era | Matching Format: Paperback |

3740

3745

Search Results

Matching Format: Paperback

HuO: Hans-Ulrich Obrist: Interviews by Hans-Ulrich Obrist, Thomas Boutoux (Editor). Paperback.
Buy new: $59.95    Used and new from $37.77

The Spa Encyclopedia: A Guide to Treatments & Their Benefits for Health & Healing by Hannelore R. Leavy, Ph.D., Reinhard R. Bergel. Paperback.
Buy new: $34.95    Used and new from $29.37

Heidegger's Hidden Sources: East Asian Influences on His Work by Reinhard May, Graham Parkes (Translator). Paperback.
Buy new: $33.95    Used and new from $29.50

Bilingual First Language Acquisition: French and German Grammatical Development (Language Acquisition and Language Disorders, Vol 7) by Jurgen M. Meisel and Philippe Prevost (Editors). Paperback.
Buy new: $42.95    Used and new from $36.50

The Communist Manifesto by Karl Marx. Paperback.
Buy new: $5.95    Used and new from $2.95

The Karl Lagerfeld Diet by Karl Lagerfeld, et al. Paperback.
Buy new: $19.95    Used and new from $11.44

The Question Concerning Technology, and Other Essays by Martin Heidegger. Paperback.
Buy new: $14.95    Used and new from $2.50

Plato's Sophist (Studies in Continental Thought) by Martin Heidegger. Paperback.
Buy new: $29.95    Used and new from $20.97

Figure 38

| Books | Search Results |
|---|---|
| Subject | Matching Format: Paperback |
| Publisher | |
| Author | |

Books
Subject
Publisher
Author
  Nationality
  Gender
  Era

| Nationality |
|---|
| American |
| French |
| German |

3815

Search Results
Matching Format: Paperback

HuO: Hans-Ulrich Obrist: Interviews by Hans-Ulrich Obrist, Thomas (Editor). Paperback.
$9.95    Used and new from $37.77

Encyclopedia: A Guide to Treatments & Their Benefits for Health & Healing by Hannelore R. Leavy, Ph.D., Reinhard R. Bergel. Paperback.
Buy new: $34.95    Used and new from $29.37

Heidegger's Hidden Sources: East Asian Influences on His Work by Reinhard May, Graham Parkes (Translator). Paperback.
Buy new: $33.95    Used and new from $29.50

Bilingual First Language Acquisition: French and German Grammatical Development (Language Acquisition and Language Disorders, Vol 7) by Jurgen M. Meisel and Philippe Prevost (Editors). Paperback.
Buy new: $42.95    Used and new from $36.50

The Communist Manifesto by Karl Marx. Paperback.
Buy new: $5.95    Used and new from $2.95

The Karl Lagerfeld Diet by Karl Lagerfeld, et al. Paperback.
Buy new: $19.95    Used and new from $11.44

The Question Concerning Technology, and Other Essays by Martin Heidegger. Paperback.
Buy new: $14.95    Used and new from $2.50

Plato's Sophist (Studies in Continental Thought) by Martin Heidegger. Paperback.
Buy new: $29.95    Used and new from $20.97

Figure 40

| Books | Search Results |
|---|---|
| Subject | |

Publisher
Charta
Doubleday
John Benjamins Publishing Co
Harper Perennial
Oxford University Press
Routledge Publisher
Author
  Era
Add another
author Gender: Male

Interviews by Hans-Ulrich Obrist, Thomas
w from $37.77

: East Asian Influences on His Work by Reinhard May, Graham Parkes (Translator). Paperback.
Buy new: $33.95    Used and new from $29.50

Bilingual First Language Acquisition: French and German Grammatical Development (Language Acquisition and Language Disorders, Vol 7) by Jurgen M. Meisel and Philippe Prevost (Editors). Paperback.
Buy new: $42.95    Used and new from $36.50

The Communist Manifesto by Karl Marx. Paperback.
Buy new: $5.95    Used and new from $2.95

The Question Concerning Technology, and Other Essays by Martin Heidegger. Paperback.
Buy new: $14.95    Used and new from $2.50

Plato's Sophist (Studies in Continental Thought) by Martin Heidegger. Paperback.
Buy new: $29.95    Used and new from $20.97

4015

SYSTEM AND METHOD FOR INFORMATION RETRIEVAL FROM OBJECT COLLECTIONS WITH COMPLEX INTERRELATIONSHIPS

1. FIELD OF THE INVENTION

The present invention generally relates to information navigation and retrieval systems.

2. BACKGROUND OF THE INVENTION

Information retrieval from a database of information is an increasingly challenging problem, as increased computing power and networking infrastructure allow the aggregation of large amounts of information and widespread access to that information. A goal of the information retrieval process is to allow the identification of materials of interest to users.

As the number of materials that users may search increases, identifying materials relevant to the search becomes increasingly important, but also increasingly difficult. Challenges posed by the information retrieval process include providing an intuitive, flexible user interface and completely and accurately identifying materials relevant to the user's needs within a reasonable amount of time. Another challenge is to provide an implementation of this user interface that is highly scalable, so that it can readily be applied to the increasing amounts of information and demands to access that information. The information retrieval process comprehends two interrelated technical aspects, namely, information organization and access.

Faceted Classification Systems

One method to address the information organization problem is to use a faceted classification system.

A faceted classification system is a scheme for classifying a collection of materials using a set of facets, where each facet represents a collection of related values or categories. For example, for a collection of materials representing a catalog of books, the facets might include Author, Subject, Year of Publication, etc., and the Author facet might include values like "Herman Melville" and "Mark Twain."

The values in a facet may be organized hierarchically, with more general topics at the higher levels of the hierarchy, and more specific topics towards the leaves. For example, the Subject facet might include top-level categories such as "Business & Money" and "Computing & Internet." The "Business & Money" category might include child categories such as "Careers & Employment," "Management & Leadership," "Personal Finance," etc., and the "Computing & Internet" category might include child categories such as "Graphics & Design," "Operating Systems," and "Programming."

Examples of partial facets for a books knowledge base are depicted in FIG. 1. FIG. 1 depicts part of the structure of an example Subject facet 110 and a Format facet 120. The Format facet 120 is an example of a flat facet, where the facet values such as "Hardcover" 130 and "Paperback" 135 do not have hierarchical parent-child relationships. The Subject facet 110 illustrates a facet containing hierarchical facet values, with parent facet values "Business & Money" 150 and "Computing & Internet" 180. Values in the subject facet have parent-child relationships, denoted by arrows from parent facet values to child facet values. For example, the "Business & Money" facet value 150 is the parent of the "Careers & Employment" facet value 160, which is in turn the parent of the "Cover Letters, Resumes & Interviews" facet value 170.

A faceted classification system assigns a mapping from each object in the collection to the complete set of facet categories that describe that object. Objects can be assigned an arbitrary number of categories from any facet. For example, a book might be assigned multiple Author categories, because books can be written by more than one Author. Yet a book might be assigned no value from the Illustrator facet, since it may contain no illustrations.

Faceted classification systems result in a more compact and efficiently represented taxonomic schema than traditional single-hierarchy approaches to object classification such as the Library of Congress Classification System. They are easier to extend as new dimensions of object description become necessary, compared to tree-structured systems such as the Yahoo directory.

Faceted Navigation Systems

While a faceted classification system addresses the information organization problem, it is still necessary to access this information. A faceted navigation system is a computer-implemented system that provides an interactive query refinement interface for locating and retrieving objects from a collection of materials described by a faceted classification scheme.

Typically, a faceted navigation system initially makes available the complete set of facet categories available that describe any objects in the database. The user of a faceted navigation system may select from these facet categories to narrow the set of selected objects. After the user makes a selection, the set of facet categories presented by the system is pruned to only those assigned to the remaining filtered objects. That is, the system only presents categories for which there exists an object described by both that category and all other previously selected categories.

Such an interface allows the user to select parametric query refinements incrementally, and in the process to narrow down the set of selected objects, effectively searching the database for some subset of interest. This search process is made more efficient and less frustrating by the removal of invalid facet categories that would lead to empty sets of selected objects, which are an undesirable result in most database search applications.

A faceted navigation system may organize the presentation of facet categories that are part of a hierarchical facet. For example, a faceted navigation system might show only the highest-level facet categories initially available in each facet, and provide controls for the user to expand to lower levels of the hierarchy.

U.S. patent application Ser. No. 09/573,305, entitled "Hierarchical Data-Driven Navigation System and Method for Information Retrieval," and assigned to the assignee of the present invention, discloses a system and method for implementing a faceted navigation system. The contents of Ser. No. 09/573,305 are incorporated herein by reference.

Limitations of Prior Art

Faceted navigation systems are useful for searching a collection of objects where each object is described by a set of independent facet categories. But they fail to address the need to search databases with more complex structure, where users' constraints must apply to more than one related collection of objects, and the set of matching objects depends on the relationships between those objects and the objects in other collections.

As a simple example, consider a database containing both books and people who contributed to the books as authors. For simplicity, suppose that books are described by such facets as Subject, Year of Publication, and Author, and that people are described by Nationality and Gender. Example objects in this database are depicted in FIG. 2A. FIG. 2A represents the objects as they would be stored to correspond to real-world concepts, with an individual object used to represent each book 210, and a separate object used to represent each author 220.

One shortcoming of the storage approach depicted in FIG. 2A is the inability to perform faceted navigation based on the facet values associated with related objects. For example, a user might wish to navigate books based on the properties of their authors (e.g., search for all books by Romanian authors). But this type of navigation is not possible using the storage approach of FIG. 2A.

To accomplish this task in a faceted navigation system, a system might assign categories of the author to the book objects, as depicted in FIG. 2B. For example, a faceted classification system for books could have the facets Subject, Year of Publication, Author, Author Nationality, and Author Gender. This approach may work for books that have a single author, such as book 230, but becomes problematic for books with more than one co-author, such as book 240. A search for books by American women will return books where at least one co-author is American, and one is a woman (such as book 240); but on some results those might be different co-authors (as with book 240), which may not have been the intended interpretation of the search. The source of this problem is the many-to-many relationship between books and authors: this type of data relationship in combination with the limitations of the faceted classification model cause the system to flatten the information about multiple authors into a single book object, losing the information necessary to answer the query correctly.

An alternate approach to providing faceted navigation on books in this schema is to expand the unique book-plus-author combinations into individual records described by the facet categories of the book and a single co-author, as depicted in FIG. 2C. This approach addresses the need to preserve the relationships between the facet categories associated with individual co-authors in order to answer queries correctly. In effect, it de-normalizes the data from its many-to-many form into a one-to-one form. But this approach gives rise to two new problems:

The first problem is that duplicate book results will be returned (250, 260). For example, in the knowledge base depicted by FIG. 2C a search for books on the subject of "Computer Science" would return two results for the book entitled "Algorithmic and Computational Robotics," one duplicate for each of the two co-authors.

The second problem is that the size of the database is expanded. In this example, since a unique record is required for each book-plus-co-author combination, the size of the database is increased by a factor equal to the average number of co-authors per book.

The first of these problems can be solved with extra query processing to detect and aggregate duplicate records (e.g., using the equivalent of a SQL "GROUP BY" statement). But the second problem can be especially problematic in the context of more complex schemas. The increase in database size in the books example may be acceptable; the majority of books are associated with just a single author, and the average number of authors per book in most real-world databases would be two or less, so no more than a doubling of the database size would be incurred. But the problem becomes more significant with the example depicted in FIG. 3, which illustrates a database storing information about alumni, the degrees they received, and the gifts they gave to the school.

A faceted navigation system could be used to search the set of alumni based on the facet categories of the gifts they had given and the degrees that they received. For example, it might be desired to locate alumni who had received an MBA in 1995 and who had given a gift of $500 in 2005. As in the books/authors example, flattening all of the gift and degree facet categories onto the alumni records loses information about the data interrelationships. This query would then return results such as an alumnus who gave $500 in 2004 but only $100 in 2005, which is undesirable behavior. And in this case, the approach of creating a record for each unique alumnus-plus-gift-plus-degree combination leads to problematic growth in the size of the database, as the expansion factor is determined by the three-way cross product among the different object types. For example, suppose that the average alumnus received 1.5 degrees and gave an average of 8 gifts. This would lead to a 12× growth in the size of the database.

More complex examples only exacerbate the problem, with each one-to-many and many-to-many object type relationship contributing an additional multiplicative factor to the size of the database growth factor. In general, the number of records needed for faceted navigation using the "unique combinations" approach grows exponentially in the number of object types with one-to-many and many-to-many interrelationships, making the storage of databases with even a modest number of object types intractable.

3. SUMMARY OF THE INVENTION

The present invention, a data-driven information navigation system and method, enables search and analysis of a set of objects or other materials by certain common attributes that characterize the materials, as well as by relationships among the materials. The invention includes several aspects of a data-driven information navigation system that employs this navigation mode. The navigation system of the present invention includes features of a knowledge base, a navigation model that defines and enables computation of a collection of navigation states, a process for computing navigation states that represent incremental refinements relative to a given navigation state, and methods of implementing the preceding features. For ease of presentation, the words "materials" and "objects" are used interchangeably.

In some embodiments, the present invention uses a knowledge base of information regarding the collection of materials to represent the materials and the relationships among them. The knowledge base includes a collection of facets. Each facet consists of a collection of related values that may be used to describe a subset of the objects to be stored in the knowledge base.

The knowledge base includes a collection of objects, which comprise the set of materials to be searched and retrieved. Each object is associated with a collection of facet values. An association between a facet value and an object indicates that the facet value describes or classifies the object.

The knowledge base encodes a set of relationships among the contained objects. Each relationship links an object to a related object via, for example, a named connection.

The system described herein may be used to enable the representation and computation of navigation states that specify access to a particular subset of the objects represented in the knowledge base.

In some embodiments, a navigation state is specified by an extended Boolean query expression composed from literal facet values, standard Boolean/set operators, path operators, and filter functions. Arbitrary filter functions may be used to refer to the set of objects satisfying the filter. Filter functions may be of a variety of forms, including text search, numeric and/or string range filtering, geo-spatial proximity filtering, filtering on aggregate statistics, filtering based on data clustering, etc. Filter functions may operate on any combination of the facet value associations or relationships encoded within the knowledge base to perform their filtering.

In some embodiments, a user interacts with the navigation system by accessing a progression of navigation states. In such embodiments, the system presents, as a function of the current navigation state, a set of transition options or refinements to proceed to other navigation states.

Some embodiments also support system controls or rules for bounding the set of refinements that are computed and presented to the most relevant and appropriate subset given the nature of the application.

Some of the rules supported in some embodiments include facet coverage, facet precedence, path restrictions, relevance scoring, and personalization. Facet coverage rules may dictate, for example, that simple facet refinements and compound refinements referring to a value or values in a given facet should only be presented if a sufficient percentage of the objects in view at the current navigation state are associated with a value from that facet.

Refinement generation rules allow the system to cull the potentially large set of valid refinements, restricting attention to the set most likely to be of interest and utility to the end user. Because the types of refinements that are most useful depend on the search task and the data in question, some embodiments allow dynamic specification and re-configuration of the refinement generation rules in place during system operation.

4. BRIEF DESCRIPTION OF THE DRAWINGS

The invention, including these and other features thereof, may be more fully understood from the following description and accompanying drawings, in which:

FIG. 1 is an illustration of two facets that might be associated with a books knowledge base.

FIG. 2 depicts example objects and relationships in a books knowledge base in which: FIG. 2A depicts example book and person objects as they might be stored to correspond to actual real-world concepts; FIG. 2B depicts a flat approach for storing this data in a faceted navigation system; and FIG. 2C depicts a fully denormalized approach for storing unique data combinations from this knowledge base in a faceted navigation system.

Figure 11:
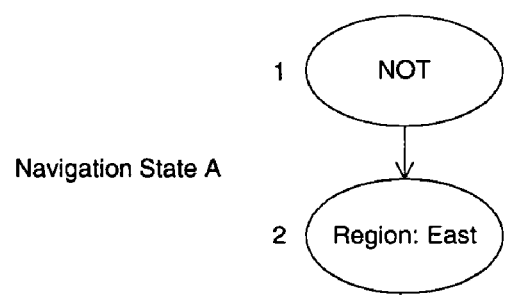
FIG. 11 is an Abstract Syntax Tree diagram representing a navigation state for the retail purchase transactions knowledge base depicted in FIG. 9.
Figure 12A:
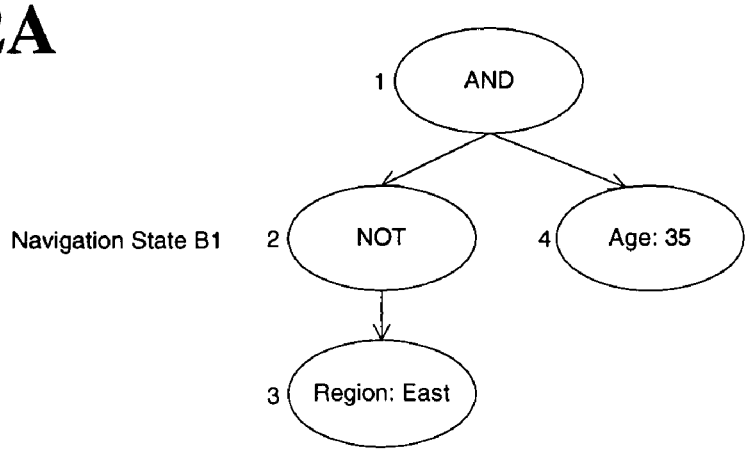
Figure 12B:
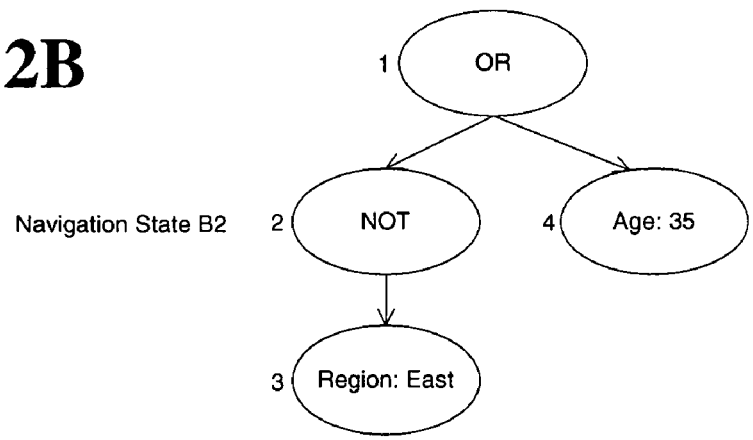
Figure 12C:
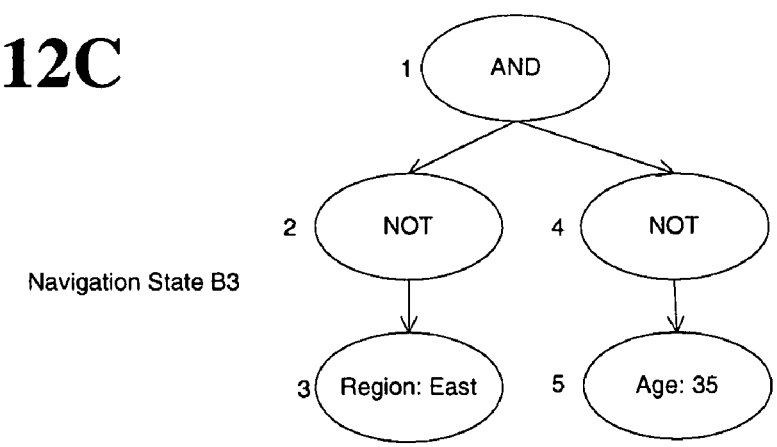

FIGS. 12A, 12B, and 12C are Abstract Syntax Tree diagrams representing navigation states that are refinements to Navigation State A depicted in FIG. 11.

Figure 13:
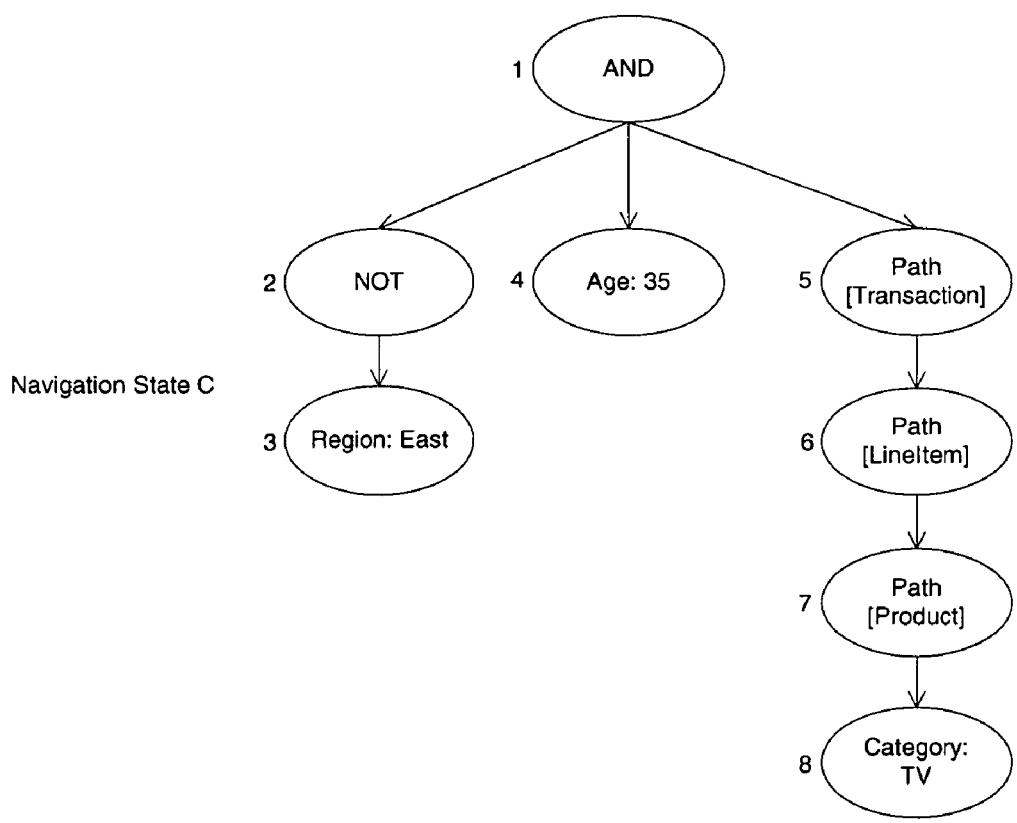

FIG. 13 is an Abstract Syntax Tree diagram representing a navigation state that is a refinement to Navigation State B 1 depicted in FIG. 12A.

Figure 14A:
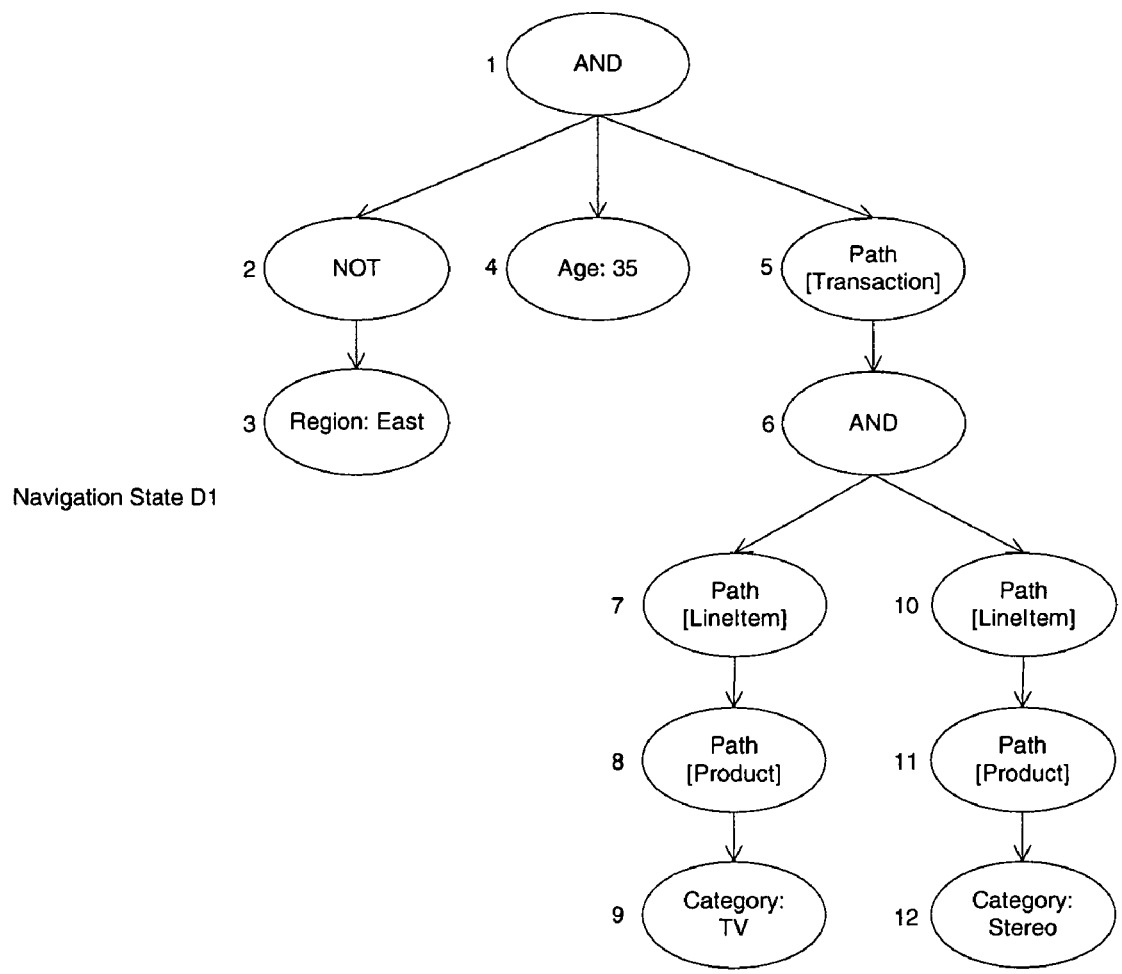
Figure 14B:
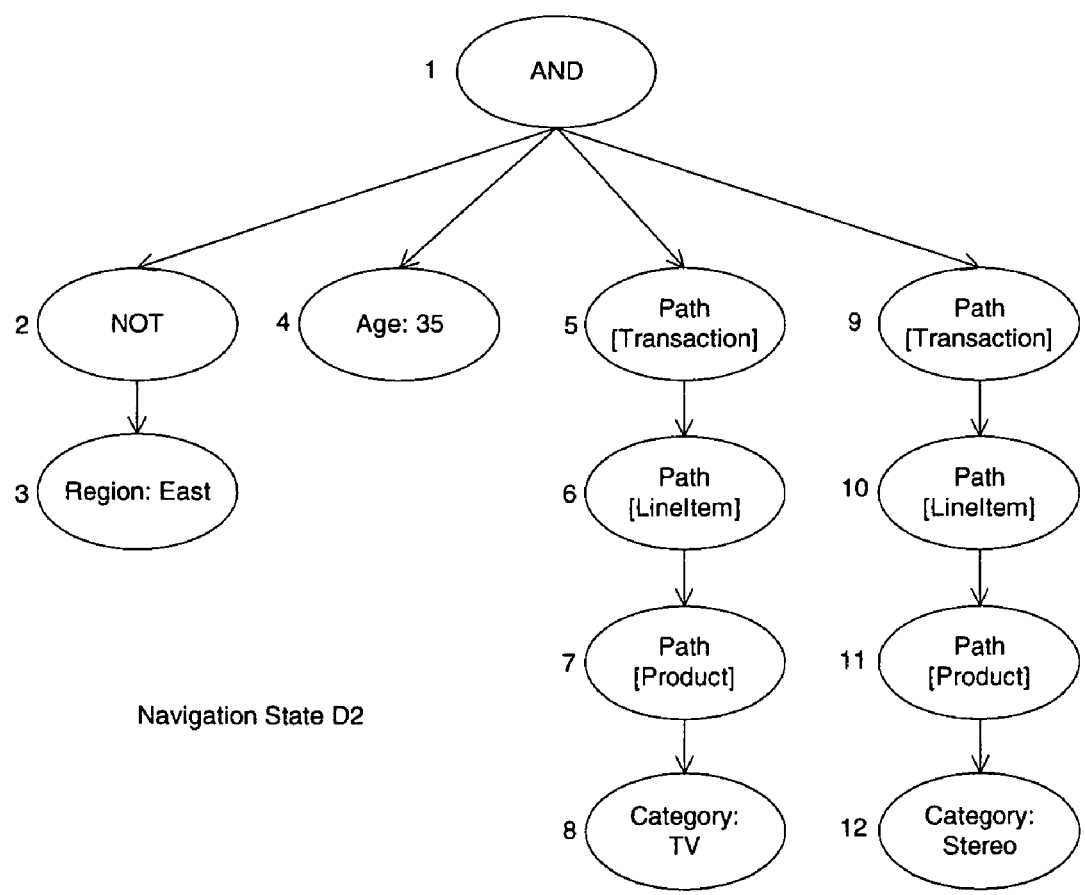

FIGS. 14A and 14B are Abstract Syntax Tree diagrams representing navigation states that are refinements to Navigation State C depicted in FIG. 13.

Figure 9:
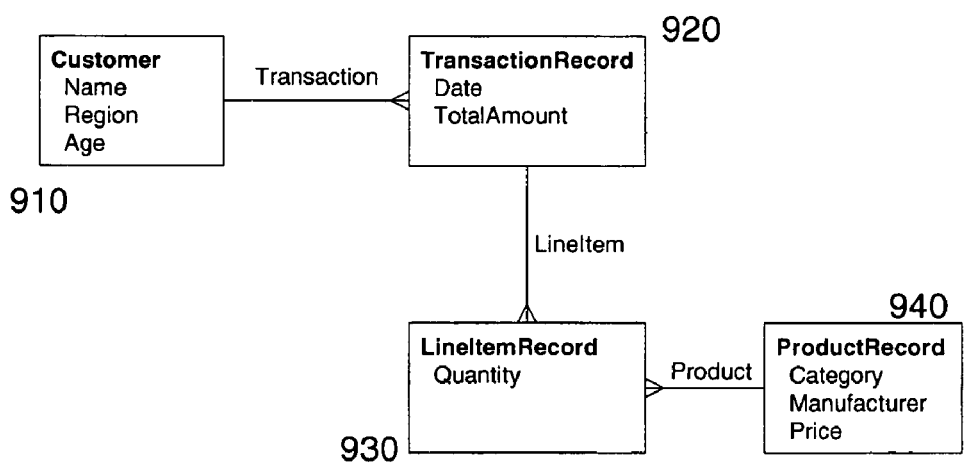
FIG. 9 is a schema diagram representing data types and relationships in a retail purchase transactions knowledge base in accordance with an embodiment of the present invention.
Figure 15:
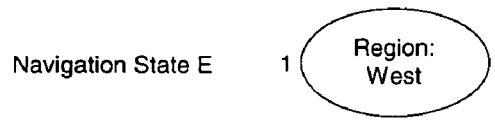

FIG. 15 is an Abstract Syntax Tree diagram representing a navigation state for the retail purchase transactions knowledge base depicted in FIG. 9.

Figure 16:
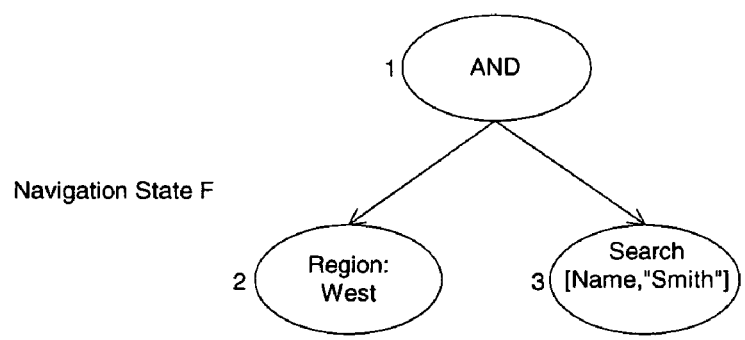

FIG. 16 is an Abstract Syntax Tree diagram representing a navigation state that is a refinement to Navigation State E depicted in FIG. 15.

Figure 17:
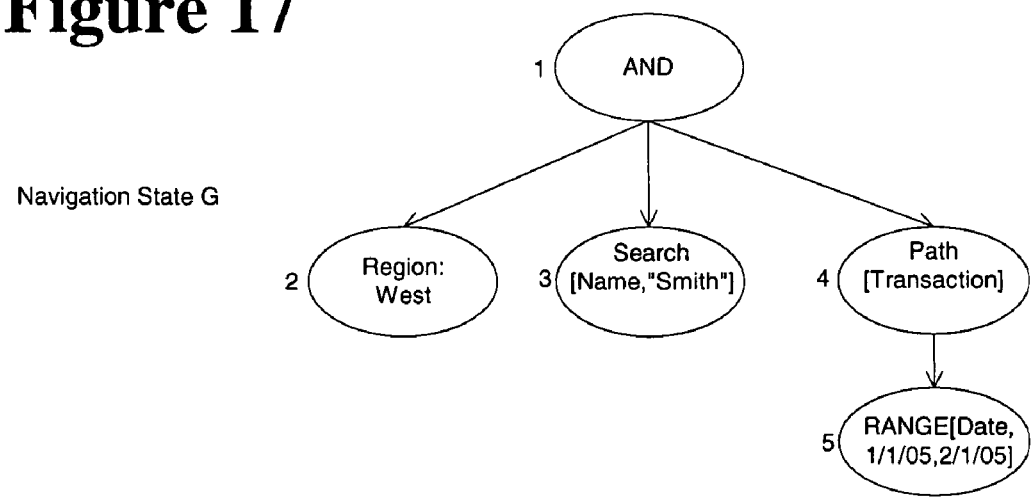

FIG. 17 is an Abstract Syntax Tree diagram representing a navigation state that is a refinement to Navigation State F depicted in FIG. 16.

Figure 18:
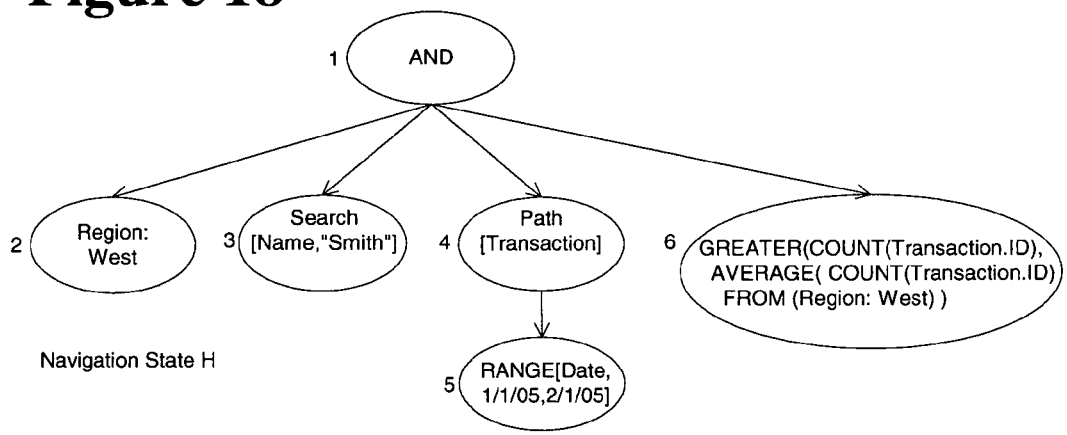

FIG. 18 is an Abstract Syntax Tree diagram representing a navigation state that is a refinement to Navigation State G depicted in FIG. 17.

Figure 19:

FIG. 19 is an Abstract Syntax Tree diagram representing a navigation state for the retail purchases transactions knowledge base depicted in FIG. 9.

Figure 20:
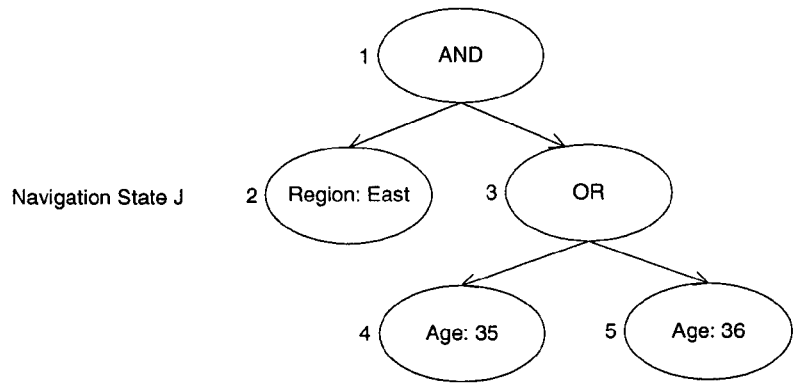

FIG. 20 is an Abstract Syntax Tree diagram representing a navigation state that is a refinement to Navigation State I depicted in FIG. 19.

Figure 21:
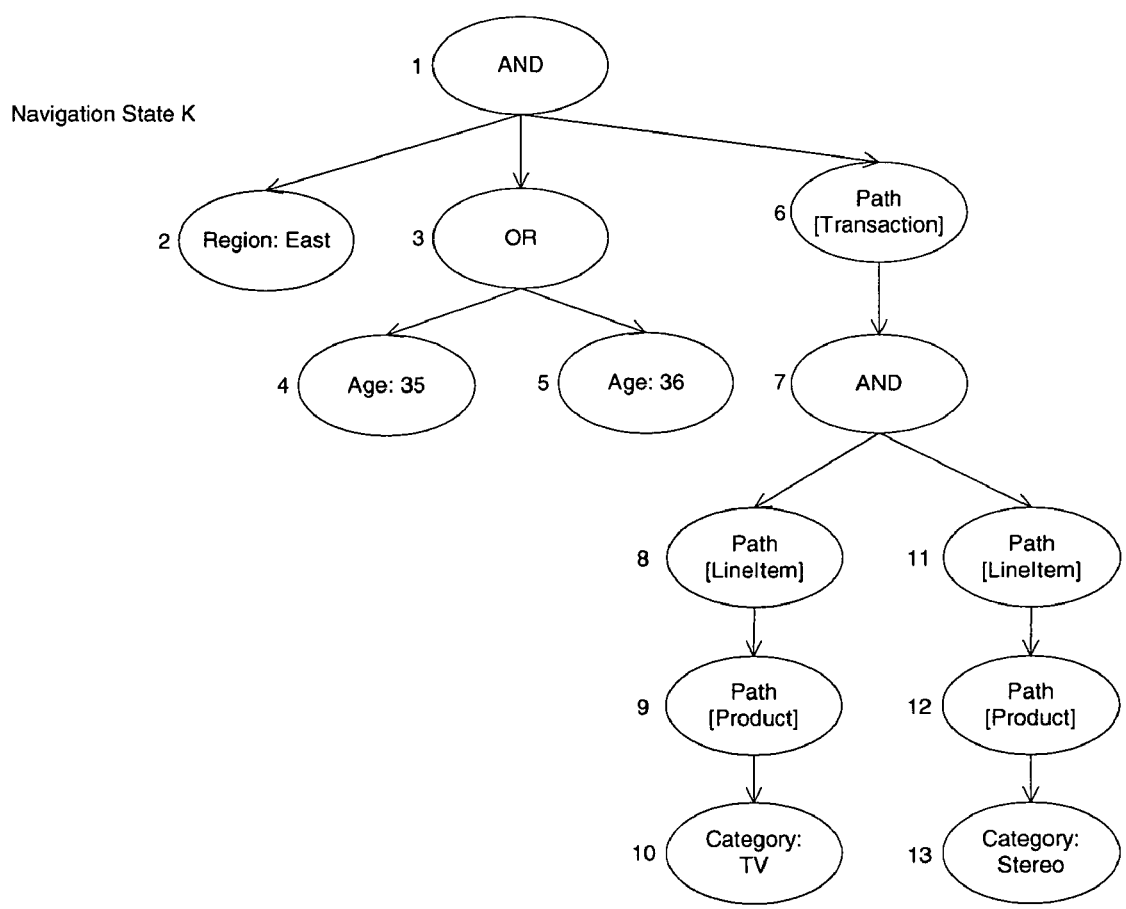

FIG. 21 is an Abstract Syntax Tree diagram representing a navigation state that is a refinement to Navigation State J depicted in FIG. 20.

Figure 22:
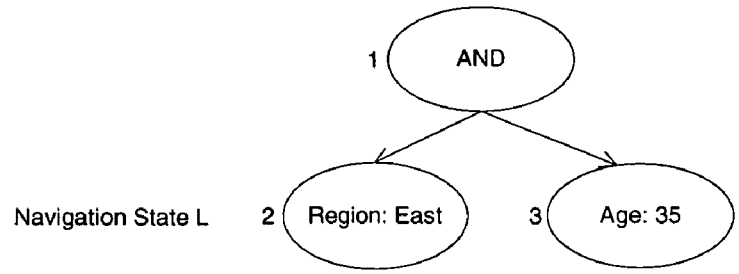

FIG. 22 is an Abstract Syntax Tree diagram representing a navigation state for the retail purchases transactions knowledge base depicted in FIG. 9.

Figure 23:
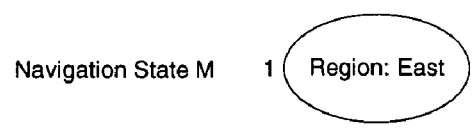

FIG. 23 is an Abstract Syntax Tree diagram representing a navigation state that is a refinement to Navigation State L depicted in FIG. 22.

Figure 24:
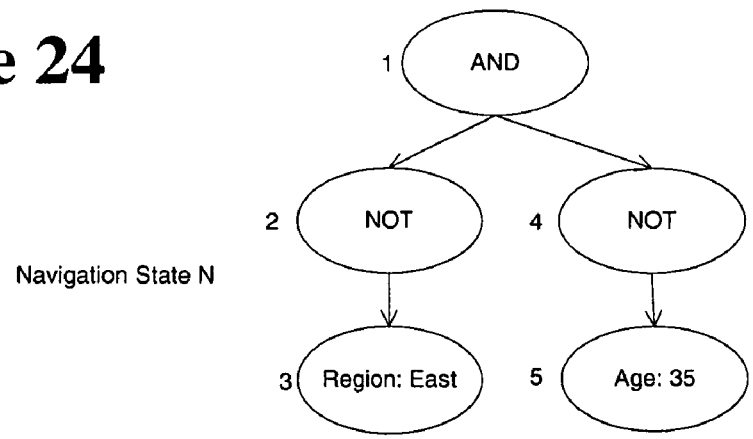

FIG. 24 is an Abstract Syntax Tree diagram representing a navigation state for the retail purchases transactions knowledge base depicted in FIG. 9.

Figure 25:
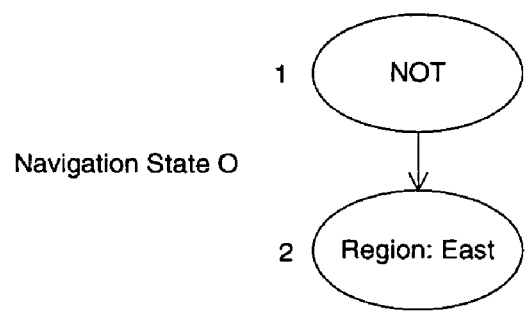

FIG. 25 is an Abstract Syntax Tree diagram representing a navigation state that is a refinement to Navigation State N depicted in FIG. 24.

Figure 26:
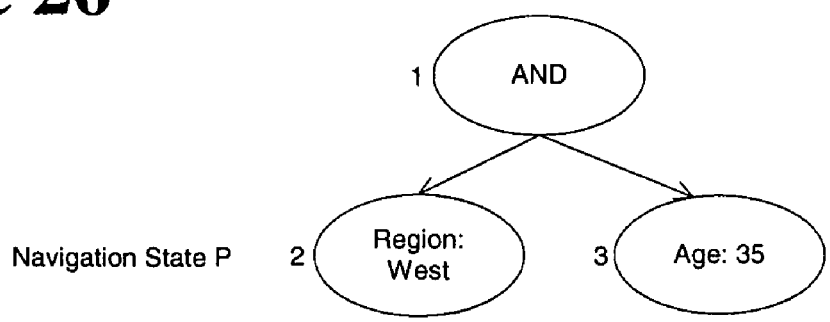

FIG. 26 is an Abstract Syntax Tree diagram representing a navigation state that is a refinement to Navigation State L depicted in FIG. 22.

Figure 27:
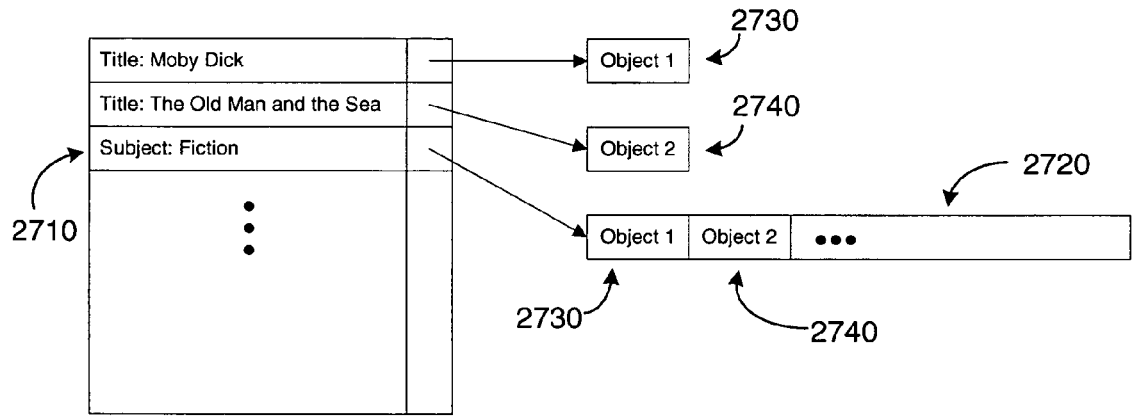

FIG. 27 is a diagram of an inverted index structure for storing the association between facet values and the collections of objects described by those facet values in accordance with an embodiment of the present invention.

Figure 28:
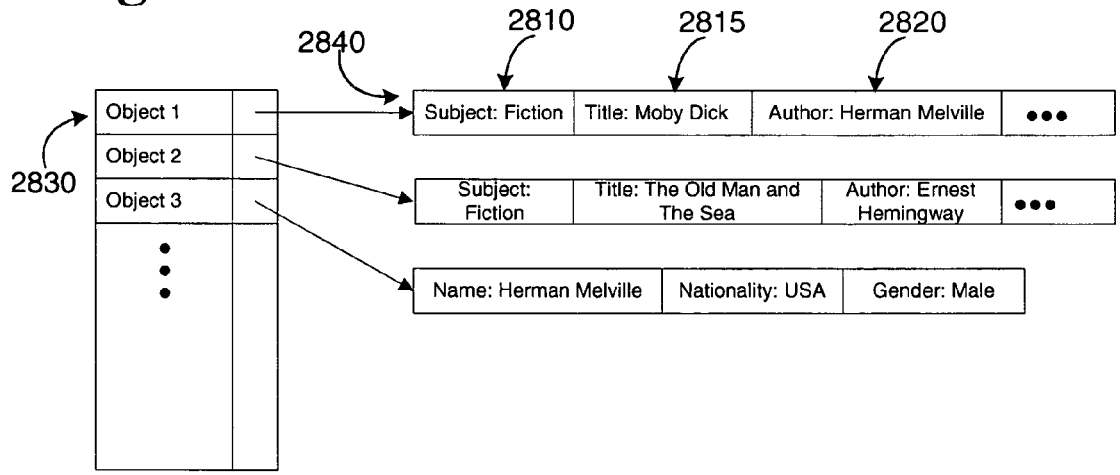

FIG. 28 is a diagram of a data structure for storing the association between objects and the collections of facet values that describe them in accordance with an embodiment of the present invention.

Figure 29:
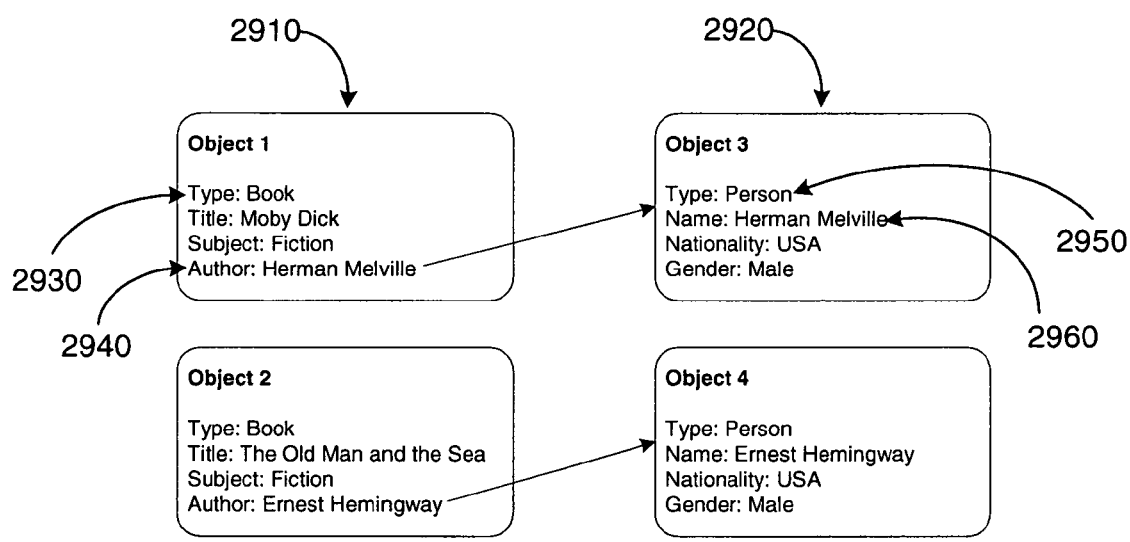

FIG. 29 is a diagram of example objects from a book knowledge base illustrating the use of facet value associations to store object relationships in accordance with an embodiment of the present invention.

Figure 30:
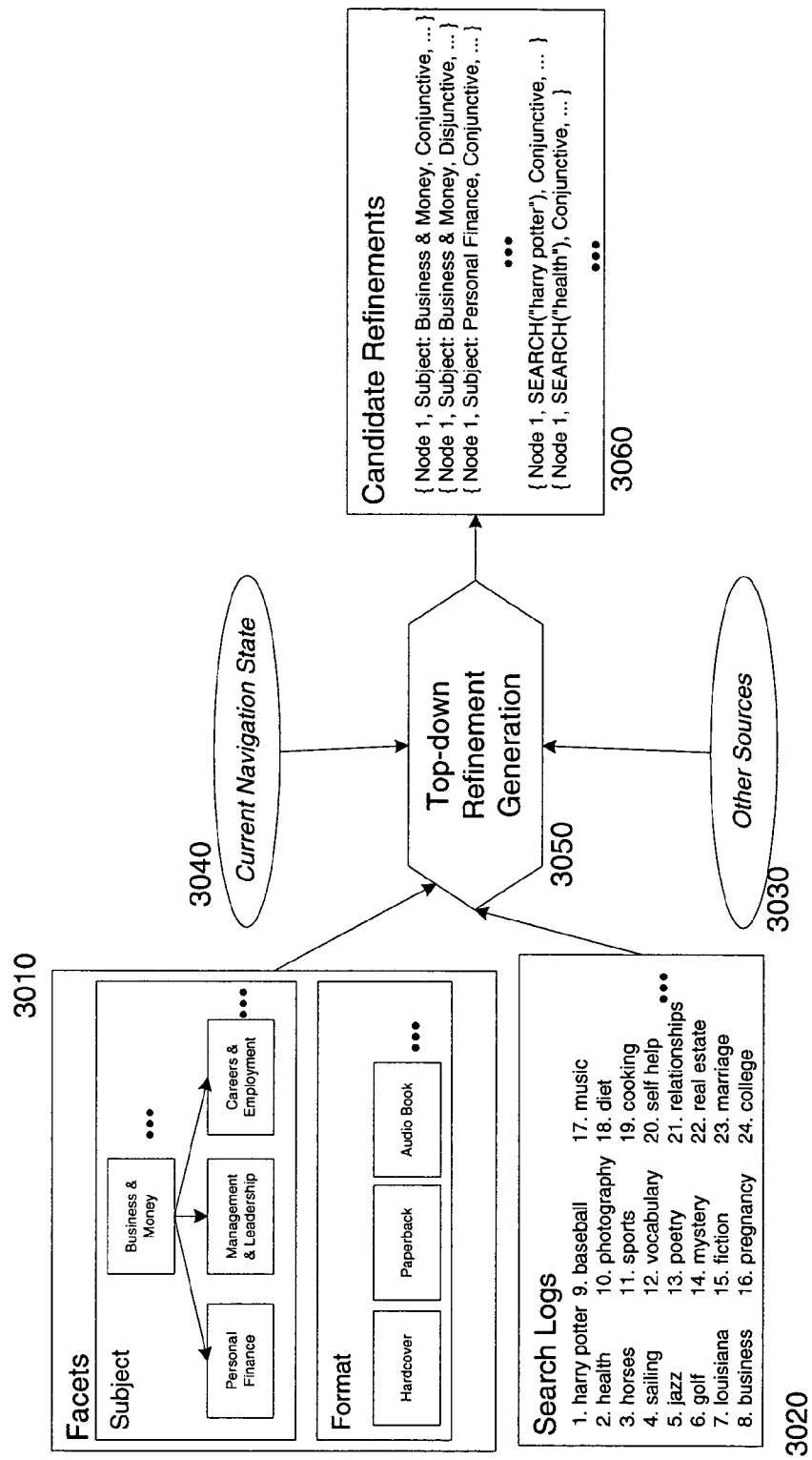

FIG. 30 is a diagram illustrating inputs and output of a top-down query generation process for generating candidate refinements in accordance with an embodiment of the present invention.

Figure 31:
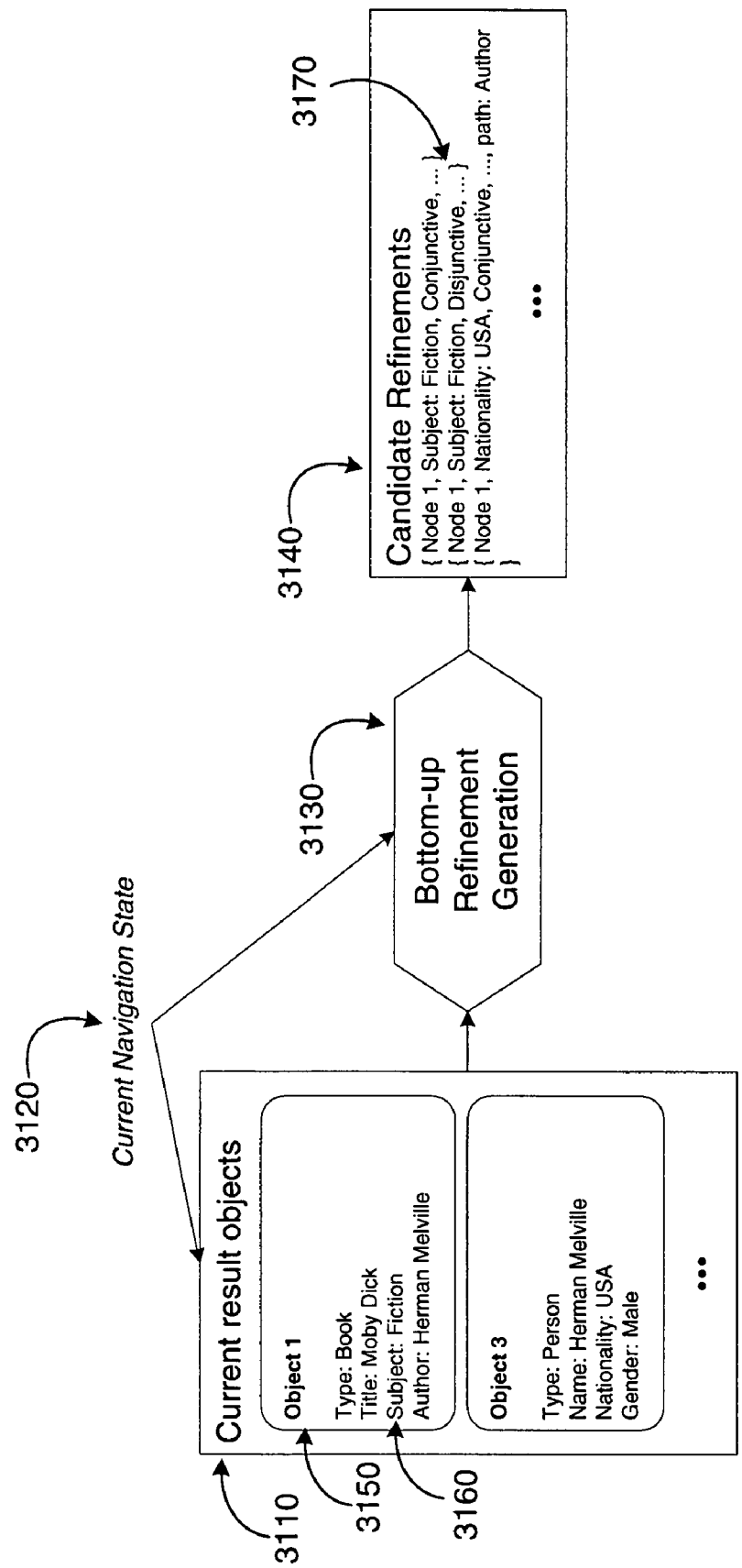

FIG. 31 is a diagram illustrating inputs and output of a bottom-up data-driven process for generating candidate refinements in accordance with an embodiment of the present invention.

Figure 32:
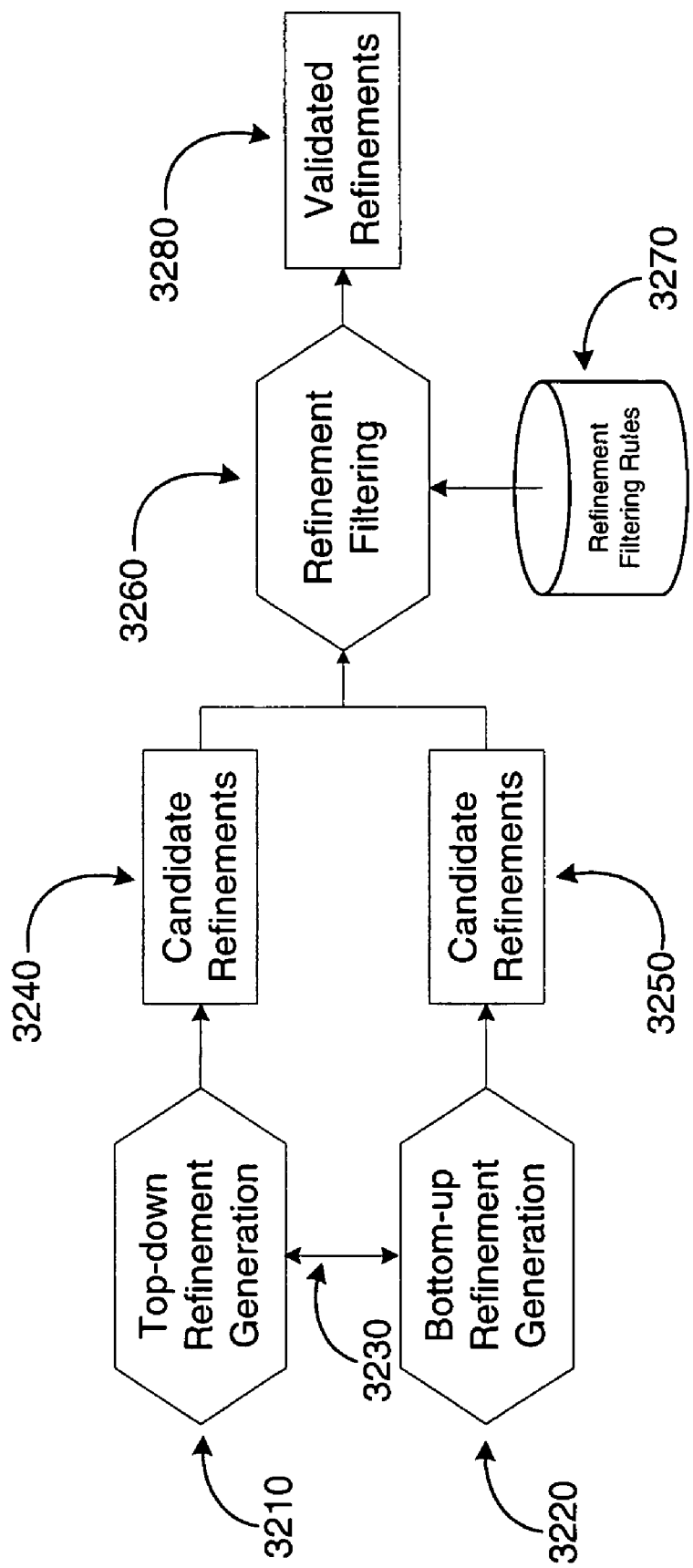

FIG. 32 is a diagram illustrating inputs, outputs, and data flow of a refinement generation process in accordance with an embodiment of the present invention.

Figure 33:
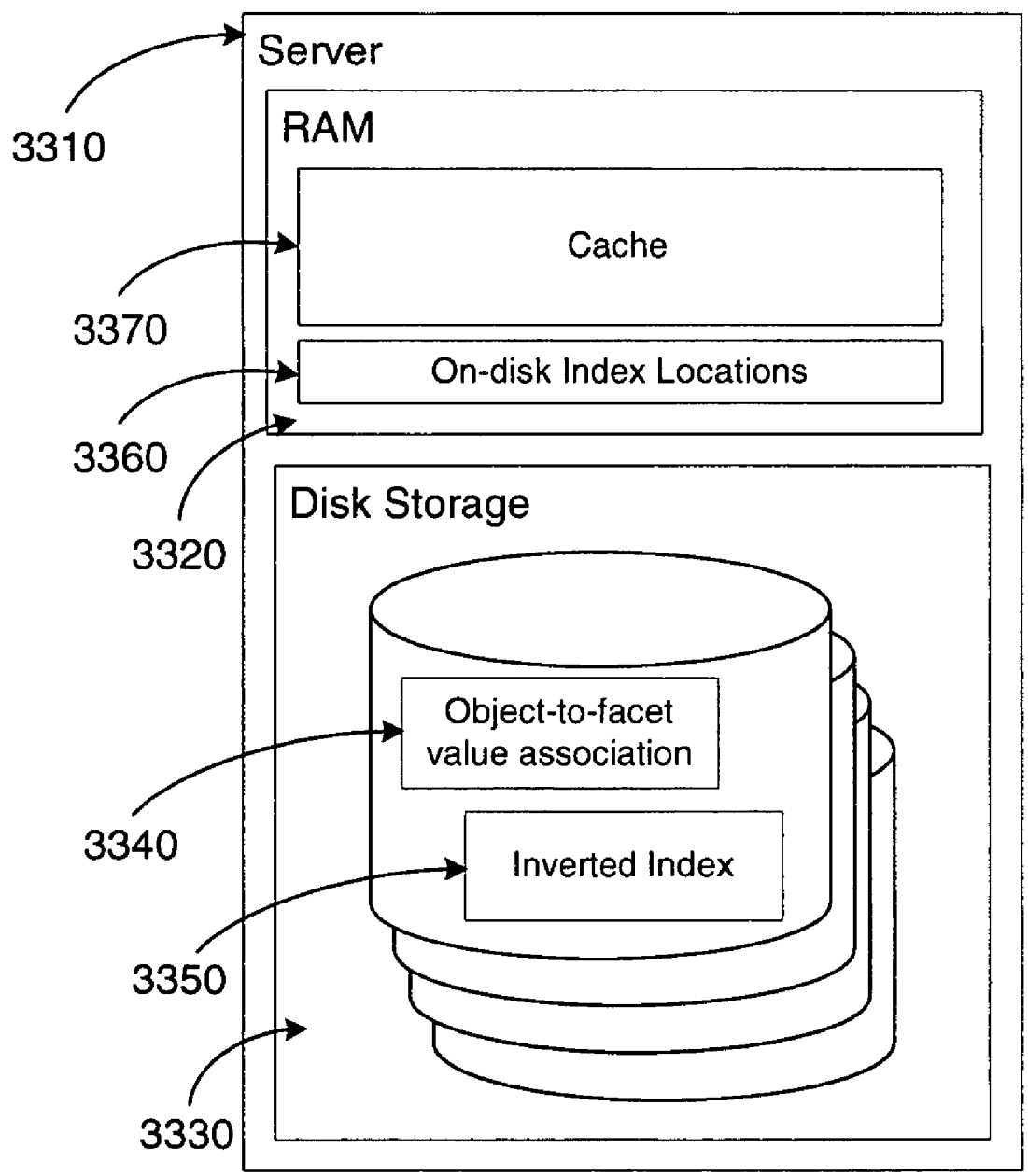

FIG. 33 is a diagram illustrating the storage of a knowledge base in accordance with an embodiment of the present invention.

Figure 34:
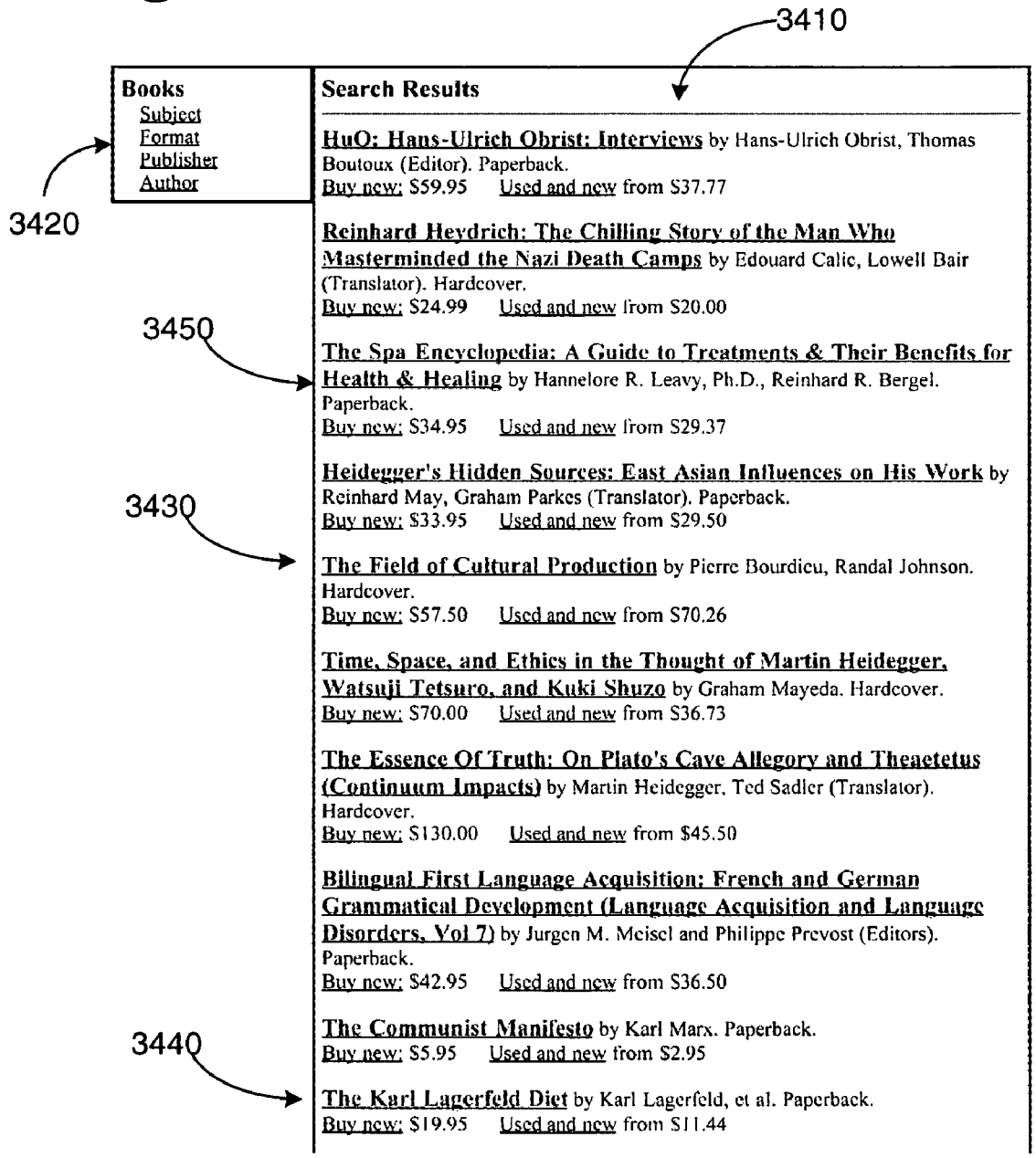

FIG. 34 is a view of a user interface to a navigation system in accordance with an embodiment of the present invention.

Figure 35:
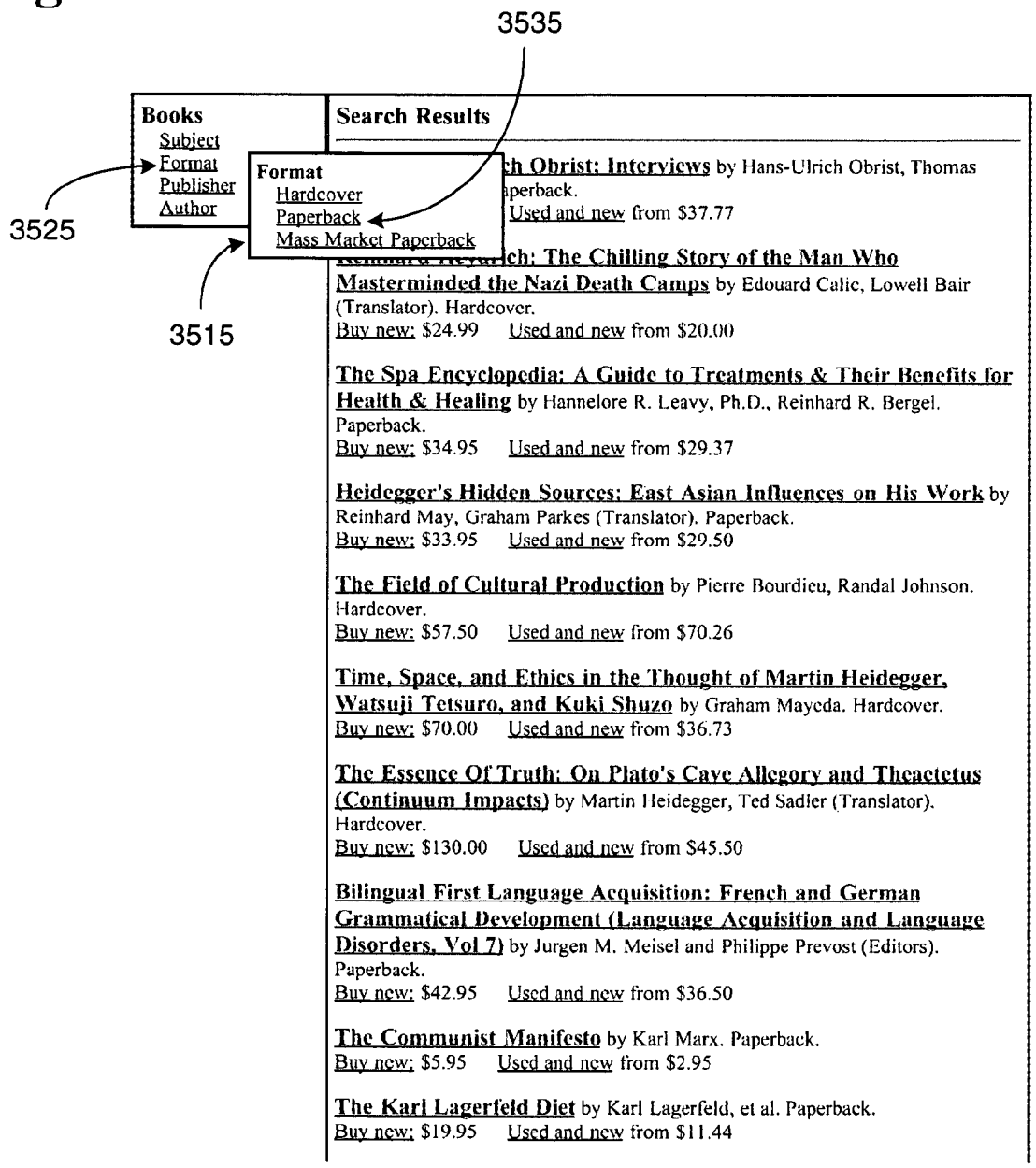

FIG. 35 is a view of the user interface of FIG. 34, showing a pop-up menu of refinements.

Figure 36:
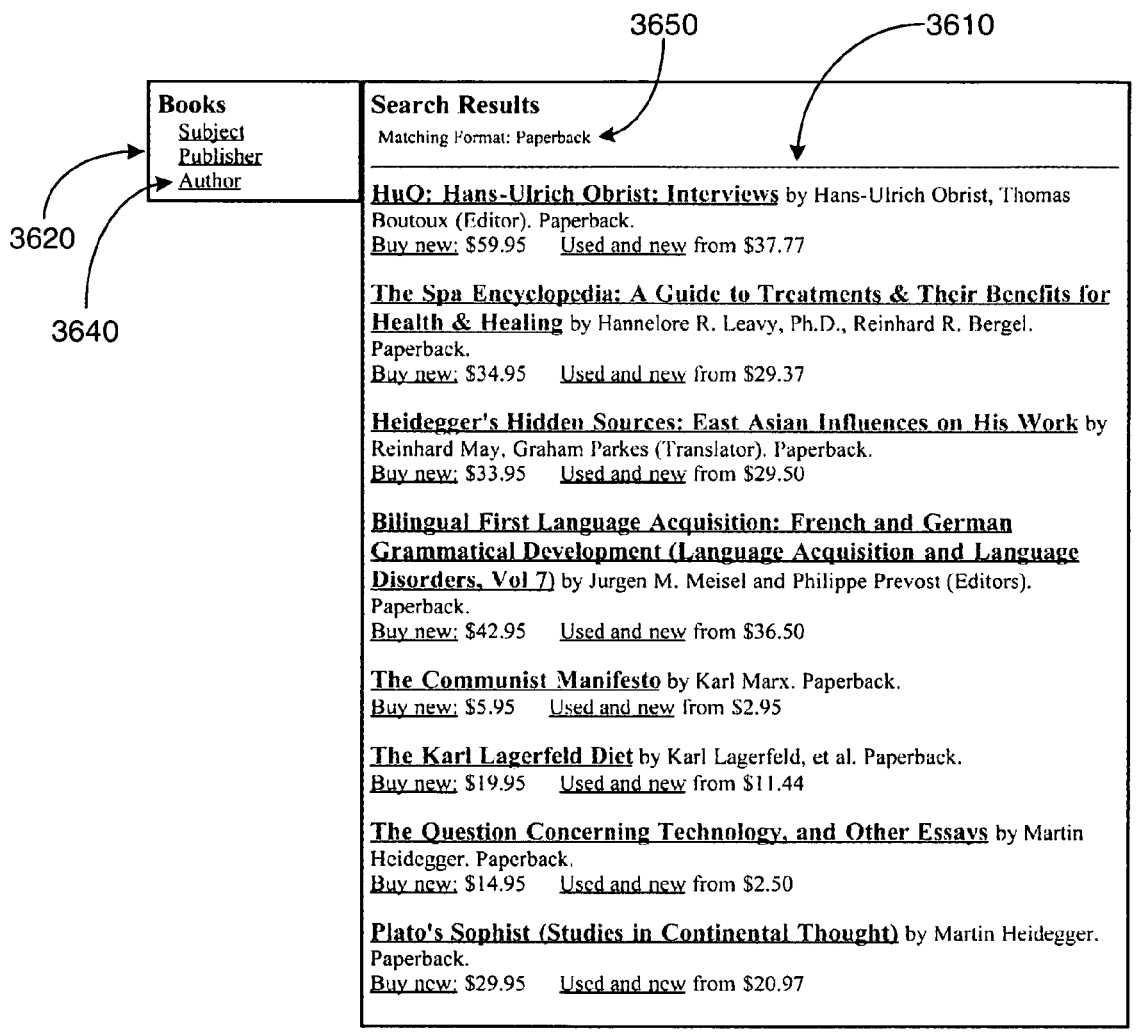

FIG. 36 is a view of the user interface of FIG. 34, showing a navigation state and associated refinements.

FIG. 37 is a view of the user interface of FIG. 34, showing a navigation state and associated refinements.

FIG. 38 is a view of the user interface of FIG. 34, showing a pop-up menu of refinements.

Figure 39:
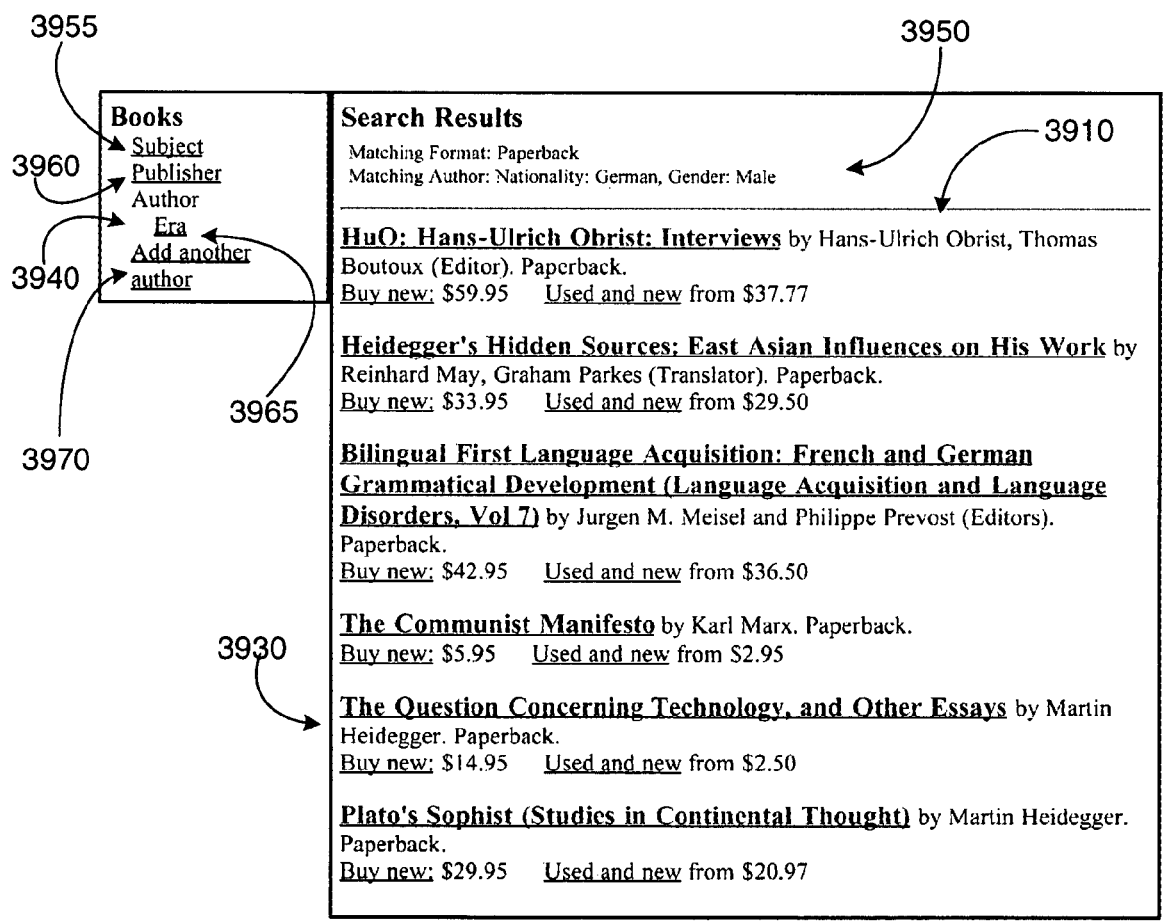

FIG. 39 is a view of the user interface of FIG. 34, showing a navigation state and associated refinements.

FIG. 40 is a view of the user interface of FIG. 34, showing a pop-up menu of refinements.

Figure 41:
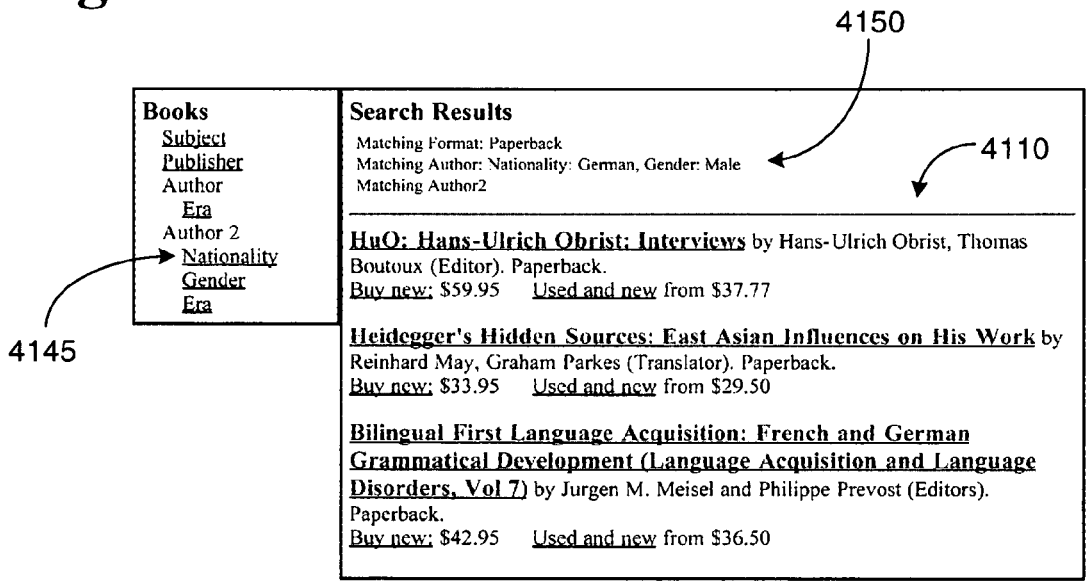

FIG. 41 is a view of the user interface of FIG. 34, showing a navigation state and associated refinements.

Figure 42:
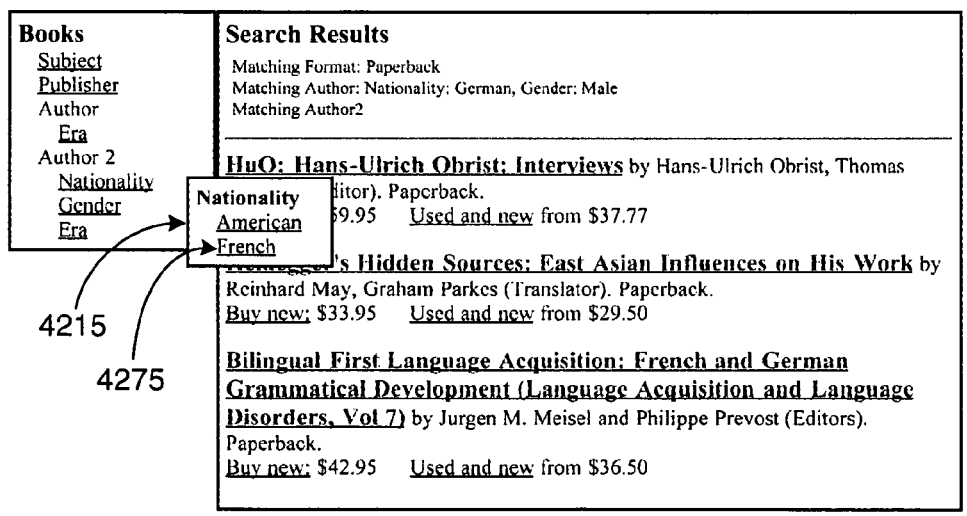

FIG. 42 is a view of the user interface of FIG. 34, showing a pop-up menu of refinements.

Figure 43:
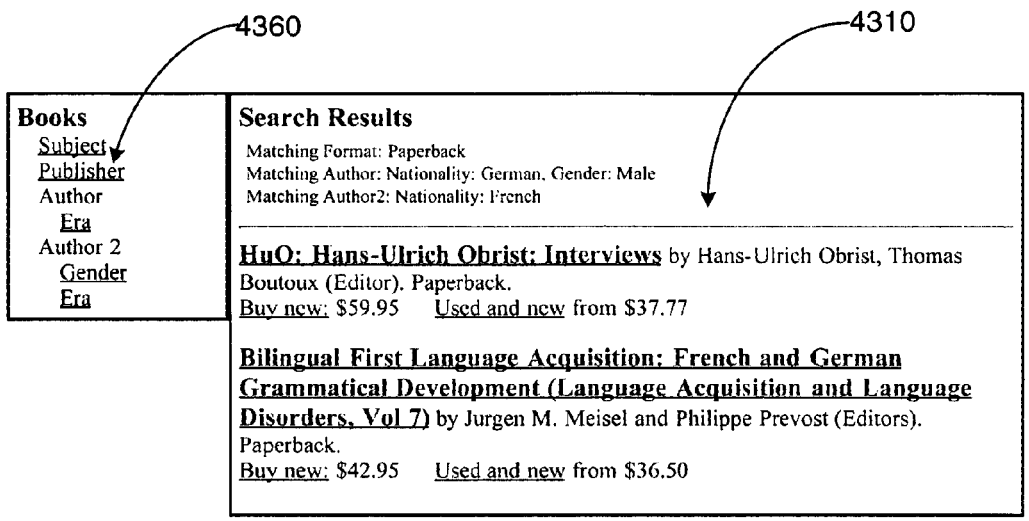

FIG. 43 is a view of the user interface of FIG. 34, showing a navigation state and associated refinements.

Figure 44:
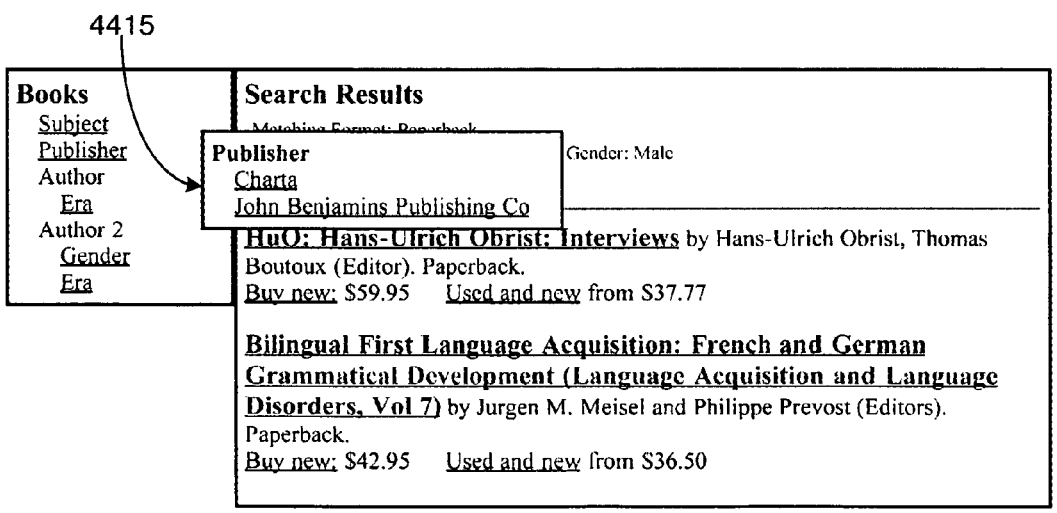

FIG. 44 is a view of the user interface of FIG. 34, showing a pop-up menu of refinements.

5. DETAILED DESCRIPTION OF THE INVENTION

The present invention includes several aspects of a data-driven information navigation system. The navigation system of the present invention includes features of a knowledge base, a navigation model that defines and enables computation of a collection of navigation states, a process for computing navigation states that represent incremental refinements relative to a given navigation state, and methods of implementing the preceding features.

Knowledge Base

The present invention uses a knowledge base of information regarding the collection of materials to represent the materials and the relationships among them.

Facets

The knowledge base includes a collection of facets. Each facet consists of a collection of related values that may be used to describe a subset of the objects to be stored in the knowledge base. For example, the knowledge base for the books domain might include facets such as Subject and Publication Year to describe books directly, along with Nationality and Gender to describe people who contributed to the books, such as authors and illustrators. The Subject facet might include such values as Biology and History, while the Nationality facet might include such values as French and German. As used herein, the notation X: Y refers to the value Y for facet X, e.g., Subject: Biology and Nationality: German.

The values in a facet can be organized using parent-child relationships. For example, the Subject facet in a books knowledge base might include such values as Subject: Science and Subject: Biology, where Subject: Biology is a child value of Subject: Science. The hierarchy of values in a facet may be a tree, in which each value other than the root of the hierarchy has a single parent. More generally, the hierarchy may represent a directed acyclic graph, in which a value may have more than one parent, but the parent relationships do not form a directed cycle. For example, a facet value such as Subject: Art History might have multiple parent facet values including Subject: Art and Subject: History. The hierarchy can be extended to arbitrary depth, and its structure need not be balanced.

The values in a facet may be of arbitrary size and form. For example, the values in a facet may correspond to database rows, text, XML or SGML documents, digital images, or any combination of these elements and any other digital information.

Objects

The knowledge base includes a collection of objects, which comprise the set of materials to be searched and retrieved. Each object is associated with a collection of facet values. An association between a facet value and an object indicates that the facet value describes or classifies the object. The assignment of a descendant facet value to an object implies that all ancestor facet values are also associated with the object. For example, if a book object is assigned the facet value Subject: Art History, which is a descendant of the facet value Subject: History, then the book is implicitly associated with the facet value Subject: History.

Objects may be assigned multiple values from a given facet. For example, a book about the history of music might be assigned both of the facet values Subject: History and Subject: Music. Objects may be assigned no values from a given facet. For example, objects in the books knowledge base representing authors would not be assigned values from the Subject facet. The set of facets represented, and the number of values associated from any facet, may vary arbitrarily from object to object.

Objects in the knowledge base may represent a heterogeneous collection of concepts. For example, in the books knowledge base, some of the objects could represent books, while others could represent people who had contributed to the books, for example as authors. A facet may be used to allow the identification of sub-collections of interest. For example, all of the objects in the books knowledge base might be assigned either the facet value Type: Book or Type: Person, where objects of Type: Person are used to represent authors and illustrators.

Relationships

The knowledge base encodes a set of relationships among the contained objects. Each relationship links an object to a related object via a connection, which may be specified by a name or by some other means, e.g., the types of the source and target objects. Relationships may be directed, relating a given source object to a given target object. Relationships also may be undirected, relating two objects in a bi-directional sense.

Figure 1:
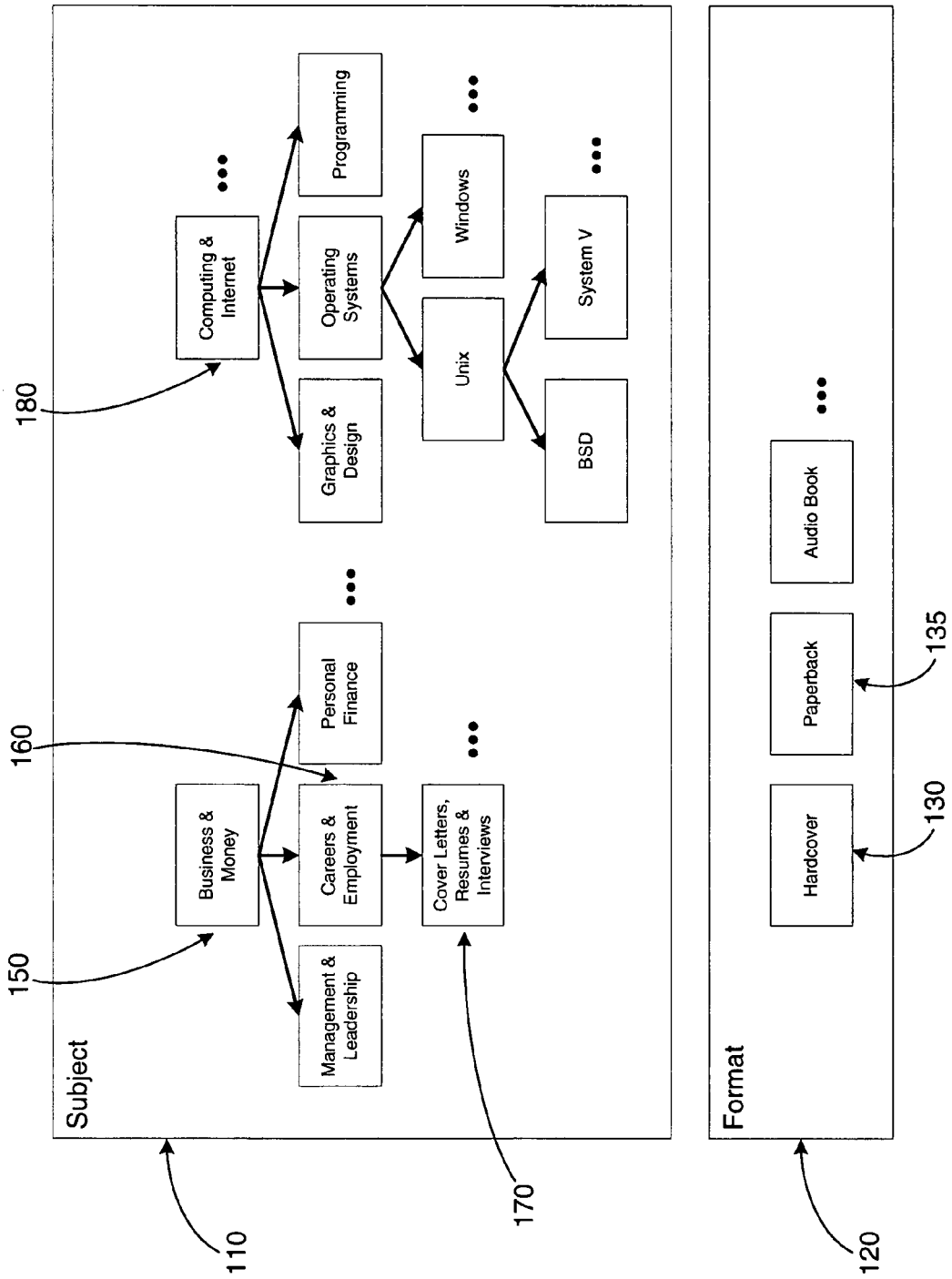
Figure 3:
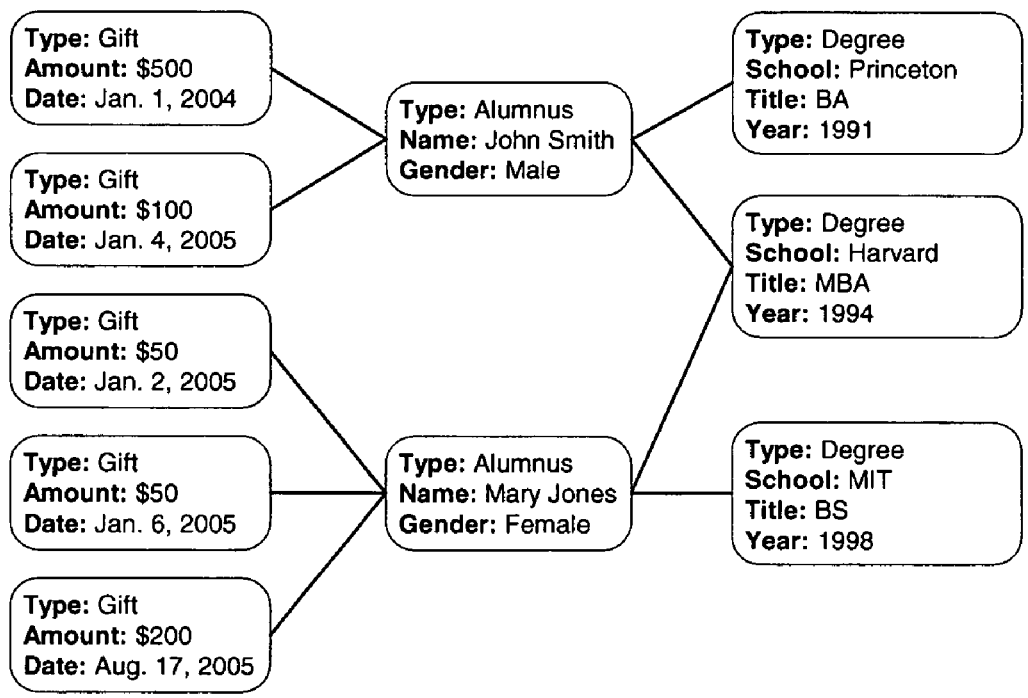
FIG. 3 depicts example objects and relationships in an alumni gift-giving knowledge base.
Figure 4:
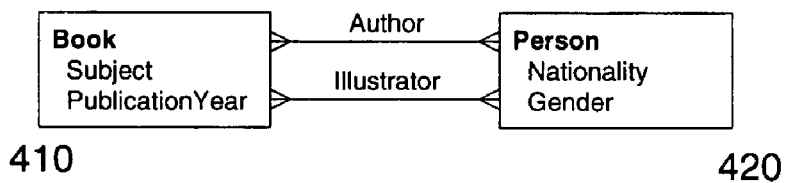
FIG. 4 is a schema diagram representing data types and relationships in a books knowledge base in accordance with an embodiment of the present invention.
Figure 5:
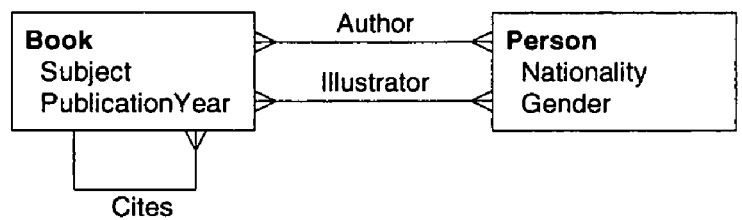
FIG. 5 is a schema diagram representing data types and relationships in a books knowledge base in accordance with an embodiment of the present invention.
Figure 6:
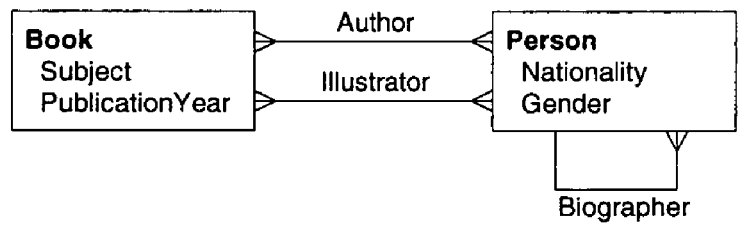
FIG. 6 is a schema diagram representing data types and relationships in a books knowledge base in accordance with an embodiment of the present invention.

An example depiction of the objects and relationships in a books knowledge base is provided in FIGS. 4-6, in which the boxes represent types of objects, lines connecting the boxes represent relationships, and a V-shaped endpoint represents a one-to-many relationship. A single book can have multiple co-authors, and each author may contribute to multiple books. FIG. 4 depicts a books database consisting of book objects 410 and person objects 420. A book might be related to a person via an "Author" and/or an "Illustrator" relationship.

Each object may participate in zero, one, or more relationships. For example, since books may have multiple co-authors, a book object might be linked to multiple person objects via Author relationships. Also, a book may have no author associations. For example, the Bible is not typically attributed to an author.

A given source object might be related to another object via multiple relationship types. For example, in the above schema, a book might be related to a single person via both an "Author" and an "Illustrator" relationship in cases where a single person authored and illustrated a given book.

Objects may participate as both the source and the target of relationships. For example, a book knowledge base might encode citation relationships among books. If this were the case, an individual book might be the source of relationships to the other books that it cites, and might be the target of relationships from the books that cite it. An augmented schema illustrating this structure is depicted in FIG. 5.

A relationship may be bi-directional. For example, two authors may have a bi-directional "Co-author" relationship with one another. Also, an object may be related to itself. For example, if person objects in the books database were linked to other person objects via "Biographer" relationships, then the author of an autobiography would link to itself via a "Biographer" relationship, as shown in FIG. 6.

Figure 7:
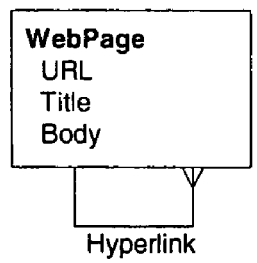
FIG. 7 is a schema diagram representing a World Wide Web knowledge base in accordance with an embodiment of the present invention.
Figure 8:
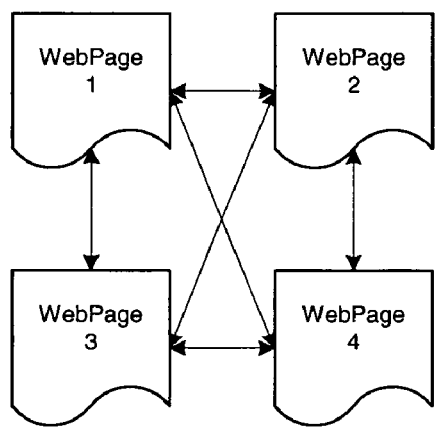
FIG. 8 is an illustration of example objects and relationships within the World Wide Web knowledge base described by FIG. 7.

More generally, arbitrary cycles are possible in the graph of relationships among objects. For example, a knowledge base may represent HTML documents, with "Hyperlink" relationships among the documents, as depicted by the schema shown in FIG. 7. The objects in an instance of this knowledge base may form a completely connected graph, as depicted in FIG. 8, if each of the documents or web pages has a hyperlink to each other page.

Navigation States

The system described herein may be used to enable the representation and computation of navigation states that specify access to a particular subset of the objects represented in the knowledge base.

In some embodiments, a navigation state is specified by an extended Boolean expression composed from literal facet values, standard Boolean/set operators, path operators, and filter functions.

With literal facet values, a facet/value pair can be used to refer to the set of objects associated with that facet value (or any descendants of that facet value). For example, the expression "Subject: History" would refer to the set of all history books.

Standard Boolean/set operators include AND, OR, and NOT operations, and parentheses for nesting. Boolean operators have their normal set-operation definitions (AND refers to set intersection, OR is union, and NOT is set complement). For example, the expression "PublicationYear: 2005 AND (Subject: History OR Subject: Geography)" refers to all of the history and geography books published in 2005.

Path operators are denoted herein by a relationship name or by a star "*" (indicating any relationship), followed by a period ".". A path operator specifying a relationship R and prefixed to an expression E refers to the set of objects related via R to one or more of the objects in the set specified by E.

Arbitrary filter functions may be used to refer to the set of objects satisfying the filter. Filter functions may be of a variety of forms, including text search (including natural language interpretation, word proximity matching, relevance score filtering, etc.), numeric and/or string range filtering, geo-spatial proximity filtering, filtering on aggregate statistics, filtering based on data clustering, etc. Filter functions may operate on any combination of the facet value associations or relationships encoded within the knowledge base to perform their filtering.

The path operator may be illustrated by some examples. The following expression corresponds to the set of history books where at least one author is American, and one author is female. These may be separate co-authors for some elements of the set, and might be a single author on others. In the following example, the expression implicitly refers only to books (as opposed to authors), since in this example only books are associated with the Subject facet.

```
(Subject: History)
AND Author.(Nationality: American)
AND Author.(Gender: Female)
```

In contrast, the following expression refers to the set of History books with at least one American female author (i.e., a single author who is both a woman and an American):

```
Subject: History
AND Author.(Nationality: American AND Gender: Female)
```

A further illustration of the path operator is shown in FIG. 9, for a knowledge base containing objects representing Customers, Transactions, and Products. Each Customer may be associated with multiple TransactionRecords, where each TransactionRecord can include multiple LineItemRecord entries, and each LineItemRecord is associated with a ProductRecord. In FIG. 9, boxes 910, 920, 930, and 940 represent various types of objects, the fields in the boxes (such as "Name," "Region," and "Age" in Customer object 910) represent facets, lines represent relationships ("Transaction," "LineItem," and "Product" ), and V-shaped endpoints represent one-to-many relationships. For example, a customer may have many transactions depicted by transaction records, and a transaction record may include many line item records.

The following expression refers to the set of all Customers in regions other than the East who have ever bought a TV and a Stereo (note, for some elements of the set, the Customer may have bought the TV and the Stereo in different transactions; for other Customers the TV and Stereo might have been bought in a single transaction):

```
(NOT Region: East)
AND Transaction.LineItem.Product.(Category: TV)
AND Transaction.LineItem.Product.(Category: Stereo)
```

In contrast, the following expression refers to the set of all Customers in regions other than the East who bought a TV and a Stereo in the same transaction:

```
(NOT Region: East)
AND Transaction.( LineItem.Product.(Category: TV)
   AND      LineItem.Product.(Category: Stereo) )
```

Figure 10:
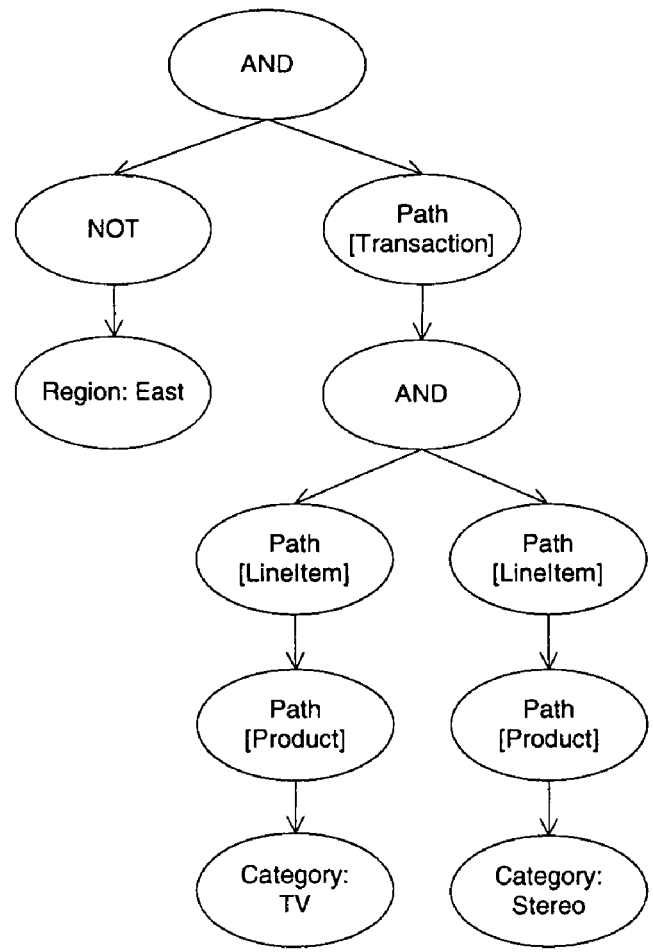
FIG. 10 is an Abstract Syntax Tree diagram representing a navigation state for the retail purchase transactions knowledge base depicted in FIG. 9.

In addition to the textual representation presented here, expressions of this form can be represented as abstract syntax trees (ASTs). For example, the previous expression could be represented as shown in FIG. 10. In addition to representing graphically the above expression, FIG. 10 graphically represents the navigation state corresponding to the set of all Customers in the knowledge base in regions other than the East who bought a TV and a Stereo in the same transaction.

Refinements

In some embodiments of the navigation system, a user interacts with the navigation system by accessing a progression of navigation states. In such embodiments, the system presents, as a function of the current navigation state, a set, ordered or unordered, of transition options to proceed to other navigation states. We refer to this set of transition options as a set of refinements, since these navigation states typically represent variations of the current navigation state that incrementally aid the user towards resolving a particular task.

To illustrate the role of refinements, FIGS. 34-44 show a user interface to several navigation states and their associated refinements in accordance with one embodiment of the invention. FIG. 34 shows an interface for navigating a collection of book objects. The book objects are related to people objects via an author relationship. The view shown represents a navigation state with a default access specification of "All books." The list 3410 shows some of the books corresponding to this navigation state. Several facets 3420 such as Subject and Publisher are shown, and these facets indicate ways in which a user might refine this navigation state. List 3410 includes hardcover books, such as "The Field of Cultural Production" 3430, and paperback books, such as "The Karl Lagerfeld Diet" 3440 and "The Spa Encyclopedia" 3450. In FIG. 35, the user has selected the Format facet 3525 for refinement. Various possibilities for refining by Format are displayed in a pop-up menu 3515. In some embodiments, only those refinements that lead to non-empty sets of objects are shown. From this menu, the user can infer that there are hardcover, paperback, and mass-market paperback books in the collection, because all of these format types are shown. "Audio" is not shown in the menu, and therefore the user may infer that this books collection contains no books with audio as their format.

Upon the user's selection of "Paperback" 3535 as a refinement, a new view representing another navigation state is generated by the navigation system, as shown in FIG. 36. The access specification for this navigation state is represented in the breadcrumb 3650, which indicates that Format: Paperback has been specified. The selection of books shown in the results list 3610 is different from the list 3410 in the previous navigation state. All of the books in the list 3610 are paperbacks. The book "The Field of Cultural Production" from the previous list no longer appears, because its format is hardcover, but the book "The Karl Lagerfeld Diet" continues to appear because its format is paperback. In addition, the list of facets 3620 in this view does not contain Format because that has already been selected, and in this example it is not possible to choose from this facet again. In other embodiments, it might be allowed to choose from the Format facet again, representing an OR-selection (e.g., books whose format is hardcover OR books whose format is paperback), an AND-selection (e.g., books whose format is both paperback AND video because they are paperbacks bundled with a DVD), or other possibilities.

As a next action, the user selects the Author menu choice 3640 of FIG. 36. This action does not change the navigation state, but it does produce the submenu of facet choices 3740 shown in FIG. 37. This submenu permits the user to refine the books corresponding to the current navigation state by characteristics of the Author objects that are related to these books. Selecting the Nationality facet 3745 results in the view shown in FIG. 38. The navigation state is still unchanged. From the pop-up menu 3815, the user can infer that in this collection, there are paperback books that have authors with nationalities of American, French, and German. The absence of "Russian" from the list allows the user to infer that the collection has no paperback books by Russian authors.

In FIG. 39, the view represents a new navigation state after several further actions by the user. The breadcrumb 3950 indicates that the user has chosen Nationality: German and Gender: Male for the Author characteristics, while retaining the earlier specification of Format: Paperback. The books presented in the results 3910 reflect these choices. Note, for example, that the book "The Spa Encyclopedia" from the earlier navigation state is absent from these results because neither author is a German male, but "The Question Concerning Technology" 3930 is present. The Author submenu 3940 has only one additional facet, Era 3965, by which the current author specification can continue to be refined. The other book object facets, Subject 3955 and Publisher 3960, remain available for refining as well. In FIG. 40, the user has selected the Publisher facet, resulting in a pop-up menu 4015 with several choices. The navigation state is unchanged in this view, and the pop-up menu shows the publishers of paperback books written by German male authors.

Instead of selecting a publisher as a refinement, we will assume that the user backs up to the view shown in FIG. 39 (for example, by closing the pop-up menu) and instead selects the refinement "Add another author" 3970. The presence of this refinement indicates that there exist paperback books with German male authors in the collection that also have at least one co-author. In other embodiments, "Add another author" may instead allow the user to introduce another set of author characteristics that must be collectively satisfied by each matching author, but without the requirement that these matching authors be distinct people from the authors matching the first set of characteristics (e.g., if the first set of characteristics consists of Nationality: German and Gender: Male, and the second set consists of Gender: Male and Era: Victorian, then books with one author having all these characteristics would match as well as books with two co-authors who each matched one of the sets). In the example depicted, however, selection of "Add another author" yields the view in FIG. 41, with the breadcrumb 4150 indicating that the access specification for this navigation state includes a second author. This list of results 4110 now lacks, for example, "The Question Concerning Technology" from the previous navigation state because this book has no co-authors.

If the user selects the Nationality 4145 facet under the Author 2 submenu, the resulting pop-up menu 4215 (shown in FIG. 42) only contains American and French as choices. These are the only two nationalities associated with co-authors on books with a German male author in the collection. Selecting French 4275 produces the view in FIG. 43, where only two matching books are shown in the result list 4310. Although a user would be unlikely to continue refining the navigation state at this point, it remains possible. Selecting Publisher 4360 produces the pop-up menu 4415 in FIG. 44. Only two publishers are now listed, in contrast to the longer list of choices 4015 in FIG. 40 when the navigation state had not been refined as much. The available refinements reflect the current navigation state.

In some embodiments, a refinement is a modification of the abstract syntax tree (AST) representing the current navigation state. The modification produces a new navigation state that is both syntactically valid and refers to a non-empty set. An infinite variety of such refinements are theoretically possible. The set of actual refinements produced by the system is determined by a set of refinement functions employed by the system. Here we describe examples of refinement functions present in some embodiments of the invention, including simple facet refinements, filter function refinements, compound refinements, and de-selection refinements. Many other refinement functions are possible, including those that generate arbitrary filter function predicates (e.g., search, range filters, statistical filters, etc.), as well as more general facet predicates.

Simple Facet Refinements

Simple facet refinements may be specified by the following elements: (1) navigation state AST location—a node in the abstract syntax tree that represents the current navigation state to which the refinement will be applied; (2) facet value—this will be added as a leaf literal node to the AST if the refinement is applied; (3) conjunctive/disjunctive sense—determines if the facet value will be added as an "OR" or an "AND" to the appropriate location in the AST; (4) negation sense—determines if a NOT operator should be prepended to the facet value if the refinement is selected; and (5) path expression—an arbitrary sequence of path operators that will be prefixed onto the facet value (and optional NOT) if the refinement is selected.

For example, suppose the current navigation state is represented by the AST depicted in FIG. 11 (nodes are numbered for reference). In Navigation State A, a simple example refinement might be:

{ Node 1,
Age: 35,
Conjunctive,
Positive,
path: null }

Selecting this refinement would produce the navigation state depicted in FIG. 12A. A different example refinement that might be presented in Navigation State A is:

{ Node 1,
Age: 35,
Disjunctive,
Positive,
path: null }

Selecting this refinement from Navigation State A would produce the navigation state depicted in FIG. 12B. A further example refinement that might be presented in Navigation { Node 1,
Age: 35,
Conjunctive,
Negative,
path: null }

Selecting this refinement from Navigation State A would produce the navigation state depicted in FIG. 12C.

From Navigation State B1 (shown in FIG. 12A), an example of a more complex refinement might be:

{ Node 1,
Category: TV,
Conjunctive,
Positive,
path: Transaction.LineItem.Product }

Relative to Navigation State B1, this refinement would lead to the navigation state depicted in FIG. 13. A subsequent refinement of this navigation state might be:

{ Node 5,
Category: Stereo,
Conjunctive,
Positive,
path: LineItem.Product }

Relative to Navigation State C (shown in FIG. 13), this refinement would lead to the navigation state depicted in FIG. 14A.

As a result of this sequence, we have selected the set of all customers who are not in the East region, who are age 35, and who have bought both a TV and a Stereo in a single transaction. In this example, all of the customers in the set have purchased the specified products. Alternatively, we could for example select a set of customers disjunctively, so that only a smaller subset of the customers had the specified transaction relationship. In the examples depicted in FIGS. 13 and 14A, the subset of the customers having the specified transaction relationship coincides with the set of customers.

A different example refinement relative to Navigation State C (from FIG. 13) might be:

{ Node 1,
Category: Stereo,
Conjunctive,
Positive,
path: Transaction.LineItem.Product }

Relative to Navigation State C, this refinement would lead to the navigation state depicted in FIG. 14B.

As a result of this selection, we have reached a navigation state that accesses the set of all customers who are not in the East region, who are age 35, and who have bought both a TV and a Stereo, but possibly in two separate transactions.

Filter Function Refinements

Simple facet refinements modify the navigation state AST by adding a literal facet value predicate (along with other operators specified by the conjunctive/disjunctive sense, negation sense, and path expression). Some embodiments of the invention also include refinement functions to generate refinements that add filter function predicates to the navigation state.

For example, the starting navigation state may be represented by the AST depicted in FIG. 15 (Navigation State E). A text search filter refinement function could use user input to generate (or could automatically generate) a refinement of the following form:

{ Node 1,
SEARCH(Name,"Smith"),
Conjunctive,
Positive,
path: null }

Selection of this refinement would result in the navigation state depicted in FIG. 16 (Navigation State F). This navigation state represents the set of customers in the West Region who match a text search for the term "Smith" in their Name. Some embodiments include search filter functionality that encompasses a full range of search capabilities including text matching operators such as regular expressions, wildcard search, and word proximity operators, basic linguistic query processing such as stemming, spelling correction, thesaurus expansion, and natural language capabilities such as question answering, word sense disambiguation, and concept search.

Some embodiments also support refinement functions to generate range filters. For example, from Navigation State F (FIG. 16), the system might produce the following refinement:

```
{      Node 1,
RANGE(Date,"1/1/05","2/1/05"),
Conjunctive,
Positive,
path: Transaction }
```

Selection of this refinement starting at Navigation State F would result in the navigation state depicted in FIG. 17 (Navigation State G). This navigation state represents the set of customers in the West Region who match a text search for the term "Smith" in their Name and who are related to a Transaction object with a Date facet value in the range Jan. 1, 2005-Feb. 2, 2005. In addition to the date range capability illustrated by this example, some embodiments also include range filtering for an assortment of data types including numbers (integer, floating point, double precision, etc.), text strings, geo-spatial coordinates, and others. In addition to simple bounded ranges, some embodiments include a selection of comparison predicates such as greater than, less than, equal to, not equal to, greater than or equal to, less than or equal to, etc.

Some embodiments also support refinement functions to generate filters based on aggregate statistics. For example, from Navigation State G (FIG. 17), the system might present a refinement such as:

```
{      Node 1,
GREATER(
    COUNT(Transaction.ID),
    AVERAGE( COUNT(Transaction.ID ) FROM (Region: West) )
Conjunctive,
Positive,
path: null }
```

Selecting this refinement in Navigation State G would lead to the navigation state depicted in FIG. 18 (Navigation State H), which corresponds to the set of customers in the West Region, who match a text search for the term "Smith" in their Name, and who are related to a Transaction object with a date in the range Jan. 1, 2005-Feb. 2, 2005, and who are associated with a greater number of transactions than the average for customers in the West Region.

Compound Refinements

Simple facet refinements and filter function refinements modify the navigation state AST by adding a single predicate (along with the other operators specified by the conjunctive/disjunctive sense, negation sense, and path expression). That is, the refinements described so far add at most a single facet value filter or filter function (such as a text search or range filter) to the navigation state per refinement step. Some embodiments also include refinement functions that generate refinements that add multiple facet value literals and/or filter functions to the navigation state in a single step, in addition to optional connective Boolean and/or path expression operators. For example, in the books knowledge base, if most books on the subject of Australian History are by Australian authors, the system may generate a single refinement that allows the selection of both of these facet categories in a single step.

These compound refinement functions generate refinements that can be represented as collections of the more basic simple facet refinements and filter function refinements. In some embodiments, a compound facet refinement consists of an ordered list of simple facet refinements that can be applied together to arrive at a valid navigation state.

For example, suppose the current navigation state is given by the AST depicted in FIG. 19 (Navigation State I). In Navigation State I, the system might produce a Compound Refinement of the following form:

```
{      Node 1, Age: 35, Conjunctive, Positive,
path: null },
{      Node 3, Age: 36, Disjunctive, Positive,
path: null }
```

Refinements of this form produce the same navigation state that would be reached by the step-wise selection of the individual elements, had they been presented as simple facet refinements. In this example refinement, the "Node 3" label indicated for the second element refers to the "Node 3" that would exist in the AST after the application of the first element. If this refinement were selected from navigation state I, the navigation state depicted in FIG. 20 (Navigation State J) would result. This navigation state corresponds to the set of customer objects associated with the Region: East facet value and either the Age: 35 or the Age: 36 facet value.

From Navigation State J, the system could produce the following compound refinement:

```
{      Node 1, Category: TV, Conjunctive, Positive,
path: Transaction.LineItem.Product },
{      Node 6, Category: Stereo, Conjunctive, Positive,
path: Transaction.LineItem.Product }
```

Selecting this refinement in Navigation State J would lead to the navigation state depicted in FIG. 21 (Navigation State K).

De-Selection Refinements

The refinement functions described so far are additive in nature. That is, they generate refinements that represent transformations of the current navigation state to add new nodes to the AST. Some embodiments also include de-selection refinement functions, which produce refinements that represent transformations of the current navigation state to remove nodes from the AST. Such refinements allow the user to de-select criteria from their current query state as they learn more about the contents of the knowledge base during the interaction session.

For example, in the retail transactions knowledge base, a marketer searching for a set of customers to whom an upcoming promotion might be targeted might select some demographic facet values as data filters. For example, the marketer might select customers in Region: East and Age: 35, accessing the navigation state depicted in FIG. 22. Examining the refinements available at this navigation state might cause the marketer then to reassess his filter selections. For example, if the promotion was related to products from a given manufacturer, and that manufacturer was not available as a simple facet refinement at navigation state L (FIG. 22), the marketer might wish to remove either the Region: East or Age: 35 filter from the navigation state AST. Removing one of these parts of the AST would broaden the set of result objects in view, consequently expanding the set of available refinements, and allow the user to navigate in more promising directions.

From Navigation State L, depicted in FIG. 22, the system could produce the following de-selection refinement:

{De-Select: Node 3}

Selecting this refinement from Navigation State L would lead to the navigation state depicted in FIG. 23 (Navigation State M). Node 1 from Navigation State L, containing the AND operator, is not part of Navigation State M in this embodiment, as Boolean AND and OR operators with a single child can be removed.

When deleting an AST node with descendant nodes, a de-selection refinement may remove all descendants. For example, suppose the current navigation state were as depicted in FIG. 24 (Navigation State N). From Navigation State N, the system could produce the following de-selection refinement:

{De-Select: Node 4}

Selecting this refinement in Navigation State N would lead to the navigation state depicted in FIG. 25 (Navigation State O).

De-selection refinements may also be included in compound refinements. This can be used to create replacement refinements. For example, from Navigation State L (FIG. 22), the system might produce the following compound refinement:

---
{ De-select: Node 2 },
{ Node 1, Region: West, Conjunctive, Positive, path: null }
---

Selecting this refinement from Navigation State L would lead to the navigation state depicted in FIG. 26 (Navigation State P). By selecting this compound refinement, we have in a single step switched our view from Age: 35 Customers associated with the Region: East facet value, to Age: 35 Customers associated with the Region: West facet value.

Refinement Generation

We have described navigation states and refinements, which are presented by the system to allow users to progress incrementally through navigation states that are more precisely associated with their information goal. Some embodiments also support system controls or rules for bounding the set of refinements computed and presented to the most relevant and appropriate subset given the nature of the application.

Some of the rules supported in some embodiments include facet coverage, facet precedence, path restrictions, relevance scoring, and personalization. Facet coverage rules dictate that simple facet refinements and compound refinements referring to a value or values in a given facet should only be presented if a sufficient percentage of the objects in view at the current navigation state are associated with a value from that facet. For example, in the books knowledge base, a facet coverage rule might be used to ensure that refinements associated with the Illustrator facet are only presented when a sufficient percentage of the books currently in view are associated with Illustrator facet values, as may be the case if the Subject: Children's Books is included in a positive sense in the current navigation state.

Facet precedence rules dictate that simple facet refinements and compound refinements referring to a value or values in a given facet should only be presented if required elements are currently present in the navigation state AST. The required element predicate may be a Boolean expression testing the presence of facets, facet values, relationships, relationship paths or sub-paths, filter functions, AST subgraphs, or any combination of these and any other navigation state elements. As a simple example, in a knowledge base representing electronics components, a facet precedence rule might dictate that refinements involving the "Resistance" facet should not be presented unless either the PartType: Resistor or the PartType: Variable Resistor facet values were part of the navigation state in a positive sense.

Path restriction rules place limits on the relationship path expressions that will be included in refinements. Path restriction rules might specify an absolute bound on the number of relationship links traversed, might specify explicitly allowed and/or disallowed paths, and might specify explicitly allowed and/or disallowed sub-paths. For example, a path restriction rule might specify that refinements should be generated with a maximum path depth of three. Or a path restriction rule might specify explicitly the set of paths that should be considered.

Relevance scoring rules place bounds on the "relevance" score associated with presented refinements. Relevance scoring rules may place an absolute lower bound on the relevance score associated with presented refinements, or may specify that the top-K most relevant refinements should be produced for some arbitrary K. Some embodiments support a variety of relevance metric functions for scoring the relevance of refinements. Scoring functions included in some embodiments include frequency, object score, popularity, and composite.

With frequency, the score for the refinement is the number of objects associated with the navigation state to which the refinement leads. With object score, the score for the refinement is an aggregate function over the objects associated with the navigation state to which the refinement leads. For example, the score might be the average of the values in the Price facet values associated with resulting objects. With popularity, the score for the refinement is determined based on the frequency of usage of that refinement over the history of system operation, or during recent system operation. For example, this metric might be used to score filter function refinements associated with text search filters, where the most relevant search refinements are the most commonly requested searches in the system for some recent period of operation.

The above relevance metrics, and other possible metrics, can be combined to produce a composite score taking into account multiple measures of relevance. Composite scores can be composed from an arbitrary subset of the available metrics. Weights may be specified to allow the relative importance of various measures to be taken into account.

Personalization rules limit the set of refinements presented based on the identity and attributes of the end user querying the system. The user's profile might indicate various demographic information, explicitly configured information view preferences, segmentation categories determined through data mining, etc. Predicates on these profile attributes may be used to limit the set of refinements presented. For example, in a system hosting a Hotels knowledge base, and in which users were segmented into "Price Conscious" and "Business Traveler" categories, personalization rules might be used to present refinements in the Room Rate facet to "Price Conscious" users, while "Business Traveler" users would be presented with refinements from the Business Services facet.

Refinement generation rules allow the system to cull the potentially large set of valid refinements, restricting attention to the set most likely to be of interest and utility to the end user. Because the types of refinements that are most useful depend on the search task and the data in question, some embodiments allow dynamic specification and re-configuration of the refinement generation rules in place during system operation.

Results Presentation

In some embodiments of the invention, the presentation of the result objects associated with a navigation state can be manipulated in order to facilitate the user's access to their content. For example, the result objects can be sorted by using one or more sort keys. Sort keys may be textual, numerical, or based on any other total or partial order.

The sort keys may be explicitly represented on the objects (e.g., as facet values), or they may be determined through some other procedure (e.g., a function such as Profit=Revenue−Expenses, where Revenue and Expenses are facets whose values are explicitly represented on the objects). The sort key may logically combine more than one key. For example, there may be a primary sort key, and then a secondary sort key used to break ties for the primary sort key.

The sort may be based on a function that refers to an object relationship. For example, books may be sorted by the popularity or total number of publications of their authors. This function may be computed relative to the entire set of objects in the knowledge base, relative to the set of objects associated with the navigation state, or relative to a set of objects different from either of these.

Sort functions may take aspects of the query into consideration. For example, the sort function for a query that includes free text may include relevance functions, such as TF-IDF (term frequency * inverse document frequency), that relate the free text to text associated with the result objects. Or a query that specifies a particular facet value might trigger the use of a related sort key.

Sort functions may be arbitrarily complex, and may be specified either in advance or as part of a query request. They may be computed in advance or at run time. Computation may be cached to avoid redundant computation and thus improve the system's efficiency.

Implementation

In some embodiments, the knowledge base is transferred to a navigable data structure in order to implement the present invention. The navigation states may be fully precomputed, computed dynamically at run-time, or partially precomputed. A cache may be used to avoid redundant computation of navigation states. In cases where navigation states are precomputed or cached, the subsequent run-time computation of those navigation states entails retrieval of the previously computed navigation states from storage. In some embodiments, some or all of the computation of navigation states is performed dynamically at run-time.

Inverted index data structures may be used to represent the mapping of facet values to objects. In some embodiments, the inverted index data structures map an object to only the most specific facet values associated with that object.

In other embodiments, the inverted index data structures also map an object to the ancestors of those facet values. For example, the inverted index data structures may map an object representing a book about biology to Subject: Biology, and might optionally map the object to the parent facet value Subject: Science. An example of an inverted index structure for mapping facet values to collections of associated objects is depicted in FIG. 27. For example, in FIG. 27 the Subject: Fiction facet value 2710 is mapped to a set of objects 2720 containing Object 1 (2730), which corresponds to "Moby Dick," and Object 2 (2740), which corresponds to "The Old Man and the Sea," along with other objects representing books that can be described as works of fiction.

In some embodiments, an index maps objects to their associated facet values. In some embodiments, this index may be implemented as an association table mapping unique object identifiers to representations of the objects that themselves store a collection of references to the facet values. In some embodiments, the facet values themselves, rather than references to them, may be stored in the object representation, as depicted in FIG. 28. For example, in FIG. 28 Object 1 (2830) is mapped to the collection of facet values 2840 containing facet values such as Subject: Fiction (2810), Title: Moby Dick (2815), and Author: Herman Melville (2820).

In some embodiments, object relationships are implemented using facet values. In some embodiments, this is accomplished through the specification of relationship schema configuration information that defines how facet value assignments can be used to associate objects within given relationships.

For example, consider the books knowledge base depicted in FIG. 29. Schema configuration information associated with this knowledge base might be used to define the "Author" relationship using the following rule: If an object B is associated with the Type: Book facet value and the Author: X facet value, and an object P is associated with the Type: Person facet value and the Name: X facet value, then object B is related to object P via an Author relationship, because both B and P share the same value X. For example, in the depicted knowledge base, this rule holds for Object 1 (2910) and Object 3 (2920), because Object 1 (2910) is associated with Type: Book (2930) and Author: Herman Melville (2940), and Object 3 is associated with Type: Person (2950) and Name: Herman Melville (2960). In this example rule, simple facet value equality is used as the predicate that determines relatedness between objects. More generally, arbitrary predicates may be used to determine relatedness. For example, the predicate may involve multiple facets and arbitrary Boolean and/or value comparison operators.

In other embodiments, a single facet might be used for object relationships, with the facet values encoding both the relationship type and the target object. There are many other approaches for representing object relationships, including using a graph data structure or a relational database with join keys.

In some embodiments, the computation of refinements includes a top-down enumeration of candidate queries that are executed against the knowledge base to determine whether they are appropriate refinements. These candidate queries could be generated by enumerating facet values, analyzing user logs, or using other sources of input to guide the refinement generation process.

For example, a set of candidate refinements might be generated by enumerating the values for a facet not present in the current navigation state. In this case, each candidate refinement represents the action of modifying the navigation state by introducing the facet value with a given object relationship. An example process for top-down refinement generation is illustrated in FIG. 30. In FIG. 30, information about the structure of the knowledge base, such as the facets and facet values 3010, along with information about application usage such as search logs 3020, and other information 3030 (for example, explicitly managed configuration), is input along with the current navigation state 3040 into the top-down refinement generating function 3050. The top-down refinement generating function 3050 enumerates possible query refinements 3060 based on these inputs.

In some embodiments, the computation of refinements includes a bottom-up enumeration of some or all of the objects corresponding to the navigation state in order to generate candidate queries. These candidate queries can then be analyzed to determine whether they are appropriate refinements.

For example, a set of candidate refinements might be generated by enumerating the values for a facet that are associated with objects in the current navigation state. In this case, each candidate refinement represents the action of modifying the navigation state by introducing the facet value with a given object relationship. An example process for bottom-up refinement generation is illustrated in FIG. 31. In FIG. 31, the set of objects 3110 matching the current navigation state 3120 is passed as input to a bottom-up refinement generating function 3130. Using the facet values associated with these input objects, the bottom-up refinement generating function 3130 creates a set of candidate refinements 3140 relative to the current navigation state 3120. For example, in FIG. 31 the input object set includes Object 1 (3150), which is associated with the facet value Subject: Fiction 3160. Because of this, the bottom-up refinement generating function 3130 creates a simple facet refinement 3170, which adds the facet value selection Subject: Fiction to the current navigation state 3120.

Regardless of how the candidate refinements are generated (e.g., top-down, bottom-up, or using a combination of the two), they can be analyzed to determine whether they are appropriate to present to a user. There are many possible conditions for appropriateness, including the following: (1) corresponding to a non-empty result set; (2) corresponding to a result set of a minimum size or fraction of the current result set; (3) corresponding to a result set of a maximum size or fraction of the current result set; (4) corresponding to a result set with a minimum information gain relative to the current result set; or (5) corresponding to a query whose complexity is below a maximum threshold.

Embodiments may use these or other appropriateness conditions to filter the set of candidate refinements. Appropriateness conditions may be used individually or in concert, depending on particular application needs. The refinement filtering process is depicted in FIG. 32. In FIG. 32, the top-down refinement generation process 3210 and the bottom-up refinement generation process 3220 are used in concert to produce candidate refinements 3240 and 3250, respectively. During the generation of candidate refinements, these processes may collaborate (as indicated by double-sided arrow 3230) to avoid duplicate work. The union of generated candidate refinements is passed as input to a refinement filtering function 3260, which uses a database of refinement filtering rules and configuration 3270 to produce a final set of validated relevant refinements 3280.

In some embodiments, the computation of refinements involves performing computation on facet values associated with objects corresponding to the current navigation state. Such computation may be used to compute functions of the facet values, or to compute functions that aggregate a set of facet values associated with the objects. This computation may proceed in a bottom-up fashion, a top-down fashion, or some combination of the two.

In some embodiments, the index, inverted index, and object relationships are stored on one or more servers, using main memory, off-line storage, or a combination of the two. A cache may be used to optimize the use of main memory, which is typically scarce relative to the availability of off-line storage. This approach to storing aspects of the knowledge base, including object-to-facet value associations and an inverted index mapping facet values to associated object collections, is depicted in FIG. 33. In FIG. 33, a server computer system 3310 containing both RAM 3320 and disk 3330 storage systems is used to store the knowledge base. Aspects of the knowledge base, including the object-to-facet value associations 3340, which might comprise a structure such as that depicted in FIG. 28, and the inverted index 3350, which might comprise a structure such as that depicted in FIG. 27, are stored on disk. Access to the on-disk representation of aspects of the knowledge base may be supported by in-memory data structures 3360. Portions of RAM 3320 might be used as a cache 3370 for components of the on-disk structures to improve access performance.

The foregoing description has been directed to specific embodiments of the invention. The invention may be embodied in other specific forms without departing from the spirit and scope of the invention. The embodiments, figures, terms and examples used herein are intended by way of reference and illustration only and not by way of limitation. The scope of the invention is indicated by the appended claims and all changes that come within the meaning and scope of equivalency of the claims are intended to be embraced therein.

We claim:

1. A computer program product, residing on a computer-readable medium, for use in navigating through information associated with a plurality of objects, the computer program product comprising instructions for causing a computer to:

access a stored plurality of objects, wherein each of the stored plurality of objects comprises an object identifier and a set of attribute-value pairs that characterize the object, wherein each value of the set of attribute-value pairs describes its respective object, and wherein at least one of the set of the attribute-value pairs includes a reference that identifies at least one respective relationship to another object of the stored plurality of objects, wherein the reference is stored as a value of the at least one of the set of the attribute-value pairs, wherein the another object is one of the stored plurality of objects, and the another object comprises a respective object identifier and a set of attribute-value pairs that characterize the another object, at least one of the set of attribute-value pairs including a reference that identifies at least one respective relationship to an object of the stored plurality of objects wherein the reference is stored as a value of the at least one of the set of the attribute-value pairs;

compute a first navigation state in response to a first query, the first navigation state corresponding to a first set of objects from the stored plurality of objects, wherein each object of the first set of objects includes the attribute-value pairs that characterize the object and the at least one respective relationship;

define, a first subset of objects from the first set of objects, wherein at least one object in the first subset includes the reference that identifies the at least one respective relationship to one or more objects in a second set of objects, wherein each object of the second set of objects includes the attribute-value pairs that characterize the object and the at least one respective relationship, and wherein at least one object in the second set of objects is distinct from the first subset of objects;

access, responsive to a user request to determine at least one possible refinement to the first navigation state, at least one object in the second set of objects, based on the reference that identifies the at least one respective relationship to another object, and obtain at least one attribute-value pair that characterizes the at least one object in the second set of objects; and present in a user interface, the at least one possible refinement to the first navigation state based on the at least one attribute-value pair that characterizes the at least one object in the second set of objects.

2. The computer program product of claim 1, wherein the instructions for causing a computer to present at least one possible refinement include instructions for causing a computer to present at least one possible refinement based at least in part on a text-based query.

3. The computer program product of claim 1, wherein the instructions for causing a computer to present at least one possible refinement include instructions for causing a computer to present at least one possible refinement based at least in part on a range-based query.

4. The computer program product of claim 1, wherein the instructions for causing a computer to present at least one possible refinement include instructions for causing a computer to present at least one possible refinement based at least in part on an aggregation of objects.

5. The computer program product of claim 1, wherein the instructions for causing a computer to present at least one possible refinement to the first navigation state include instructions to present a set of possible refinements using profile information regarding a user querying the information associated with the plurality of objects.

6. The computer program product of claim 1, wherein the instructions for causing a computer to present at least one possible refinement to the first navigation state include instructions to execute a set of candidate queries and select the at least one possible refinement from the results of executing the set of candidate queries.

7. The computer program product of claim 1, wherein the instructions for causing a computer to present at least one possible refinement to the first navigation state include instructions to compute a set of possible refinements based on analyzing an enumeration of at least some of the objects corresponding to the first navigation state.

8. The computer program product of claim 1, wherein the instructions for causing a computer to present at least one possible refinement to the first navigation state include instructions to: execute a set of candidate queries and analyze an enumeration of at least some of the objects corresponding to the first navigation state; and select the at least one possible refinement from the results of executing the set of candidate queries and of analyzing the enumeration of at least some of the objects.

9. The computer program product of claim 1, wherein the first subset of the first set of objects coincides with the first set of objects.

10. The computer program product of claim 1, wherein the instructions for causing the computer to present the at least one possible refinement include instructions for causing the computer to:
define a third set of objects that is a subset of the second set of objects, wherein each object in the third set of objects includes the at least one attribute value-pair that characterizes the at least one object in the second set of objects; and
present the at least one possible refinement based on the third set of objects.

11. The computer program product of claim 10, wherein the instructions for causing the computer to compute a second navigation state that refines the first navigation state, the second navigation state corresponding to a fourth set of objects from the plurality of objects, wherein a fourth set of objects is defined from a fifth set of objects, the fifth set of objects being a subset of the fourth set of objects, wherein each object in the fifth set is referenced by the third set of objects.

12. The computer program product of claim 1, wherein the instructions for causing the computer to present the at least one possible refinement include instructions for causing the computer to compute a second navigation state that refines the first navigation state, the second navigation state corresponding to a fourth set of objects from the plurality of objects, wherein the fourth set of objects is defined from a fifth set of objects, the fifth set of objects being a subset of the fourth set of objects, and wherein each object in the fifth set is referenced by the at least one object in the second set of objects having the at least one attribute-value pair.

13. The computer program product of claim 1, wherein the first set of objects is different from the second set of objects.

14. The computer program product of claim 1, wherein the value for at least one of the attribute-value pairs is null.

15. A computer program product residing on a computer-readable medium, for use in navigating through information associated with a plurality of objects, the computer program product comprising instructions for causing a computer to:
access a stored plurality of objects and a stored plurality of relationships between pairs of objects from the plurality of objects, each of the objects having associated attribute-value pairs that characterize the object wherein each value of the associated attribute-value pairs describes its respective object, wherein, for each relationship between a pair of objects, an attribute-value pair of a first object of the pair of objects includes a reference that identifies a respective relationship to a second object of the pair of objects, wherein the reference is stored as a value of the attribute-value pair, wherein the first and second objects are from the stored plurality of objects;
compute a first navigation state in response to a first query, the first navigation state corresponding to a first set of objects from the stored plurality of objects, wherein the objects in the first set of objects include the attribute-value pairs that characterize the objects, and at least one respective relationship;
define a first subset of the first set of objects, wherein at least one object in the first subset includes the reference that identifies the at least one respective relationship to one or more objects in a second set of objects;
access, responsive to a user request to determine at least one possible refinement to the first navigation state, at least one object in the second set of objects, based on the reference that identifies the at least one respective relationship to the one or more objects in the second set of objects and obtain at least one attribute-value pair associated with the at least one object in the second set of objects;
present in a user interface, responsive to the user request, at least one possible refinement to the first navigation state based on the at least one attribute-value pair associated with the at least one object in the second set of objects, a first possible refinement corresponding to a third set of objects, the second set of objects being a subset of the third set of objects and each object in the third set of objects including a reference that identifies at least one respective relationship to at least one object in the second set of objects, wherein the third set of objects includes a least one object distinct from the first subset of objects; and
compute a second navigation state that refines the first navigation state, the second navigation state corresponding to a fourth set of objects from the plurality of objects, wherein each object in a subset of the fourth set of objects has at least one respective relationship to one or more objects in the third set of objects.

16. The computer program product of claim 15, wherein the instructions for causing a computer to present at least one possible refinement include instructions for causing a computer to present at least one possible refinement based at least in part on a union of the second set of objects and a fifth set of objects, wherein each object in a second subset of the first set of objects has at least one respective relationship to one or more objects in the fifth set of objects.

17. A computer implemented method for navigating through information comprising:
 storing a plurality of objects and a plurality of relationships between pairs of objects from the plurality of objects, each of the objects having associated attribute-value pairs that characterize the object wherein each value of the associated attribute-value pairs describes its respective object, wherein, for each relationship between a pair of objects, an attribute-value pair of a first object of the pair of objects includes a reference that identifies a respective relationship to a second object of the pair of objects, wherein the reference is stored as a value of the attribute-value pair, wherein the first and second objects are from the stored plurality of objects;
 computing a first navigation state in response to a first query, the first navigation state corresponding to a first set of objects from the stored plurality of objects, wherein the objects in the first set of objects include the attribute-value pairs that characterize the objects, and at least one respective relationship;
 defining a subset of the first set of objects, wherein at least one object in the subset includes the reference that identifies the at least one respective relationship to one or more objects in a second set of objects;
 accessing, responsive to a user request to determine at least one possible refinement to the first navigation state, at least one object in the second set of objects, based on the reference that identifies the at least one respective relationship to the one or more objects in the second set of objects and obtaining at least one attribute-value pair associated with the at least one object in the second set of objects;
 presenting in a user interface, responsive to the user request, at least one possible refinement to the first navigation state based on the at least one attribute-value pair associated with the at least one object in the second set of objects, wherein the second set of objects includes at least one object distinct from the subset of objects, the possible refinement corresponding to a third set of objects, the third set of objects being a subset of the second set of objects and each object in the third set of objects including a reference identifies at least one respective relationship to at least one object in the second set of objects; and
 computing a second navigation state that refines the first navigation state, the second navigation state corresponding to a fourth set of objects from the plurality of objects, wherein each object in a subset of the fourth set of objects has at least one respective relationship to one or more objects in the third set of objects.

18. The method of claim 17, wherein the plurality of objects include objects of a plurality of types.

19. The method of claim 17, further comprising storing a plurality of facet-value pairs associated with the plurality of objects, wherein each of a plurality of values has an association with at least one of a plurality of facets characterizing the objects.

20. The method of claim 19, wherein the values associated with a first facet include a hierarchy of values.

21. The method of claim 20, wherein at least one value has more than one direct parent value.

22. The method of claim 19, wherein at least one of the plurality of values is a numerical value.

23. The method of claim 19, wherein at least one of the plurality of values is a categorical value.

24. The method of claim 19, wherein at least one of the plurality of values is a textual value.

25. The method of claim 19, wherein the values associated with a first facet consist of an enumerated set of values.

26. The method of claim 19, wherein the values associated with a first facet consist of values corresponding to a data type.

27. The method of claim 19, wherein the plurality of objects include objects of a plurality of types and one of the facets has values corresponding to the types.

28. The method of claim 19, wherein a first facet-value pair is associated with the second set of objects and a second facet-value pair is associated with the third set of objects, and wherein the value of the first facet-value pair is a parent of the value of the second facet-value pair.

29. The method of claim 19, wherein storing a plurality of objects and a plurality of relationships between pairs of objects, and storing a plurality of facet-value pairs, collectively includes storing on a plurality of servers.

30. The method of claim 19, further comprising presenting at least one of the first set of objects and the fourth set of objects sorted according to one or more precomputed facet values.

31. The method of claim 19, further comprising presenting at least one of the first set of objects and the fourth set of objects sorted according to one or more dynamically computed facet values.

32. The method of claim 19, further comprising presenting at least one of the fourth set of objects sorted using a function based on aggregate statistics applied to values associated with a first facet characterizing the third set of objects.

33. The method of claim 19, further comprising presenting at least one of the fourth set of objects sorted using a function based on aggregate statistics applied to values associated with a first facet characterizing the fourth set of objects.

34. A method for navigating through information comprising:
 storing a plurality of objects and a plurality of relationships between pairs of objects from the plurality of objects, each of the objects having associated attribute-value pairs that characterize the object, wherein each value of the associated attribute-value pairs describes its respective object, wherein, for each relationship between a pair of objects, a value of an attribute-value pair of a first object of the pair of objects refers to a second object of the pair of objects, wherein the first and second objects are from the stored plurality of objects;
 computing a first navigation state in response to a first query, the first navigation state corresponding to a first set of objects from the stored plurality of objects, wherein the objects in the first set of objects include the attribute-value pairs that characterize the objects, and the attribute-value pairs include at least one relationship between a pair of objects;
 defining a subset of the first set of objects, wherein at least one object in the subset includes the at least one of the stored plurality of relationships as the value of attribute-value pair that refers to one or more objects in a second set of objects;
 accessing, responsive to a user request to determine at least one possible refinement to the first navigation state, at least one object in the second set of objects, based on the at least one of the stored plurality of relationships stored as the value of attribute-value pair that refers to one or more objects in a second set of objects and obtaining at least one attribute-value pair associated with the at least one object in the second set of objects;

presenting in a user interface, responsive to the user request, a possible refinement to the first navigation state based on the at least one attribute-value pair associated with the at least one object in the second set of objects, the possible refinement corresponding to a third set of objects, the second set of objects being a subset of the third set of objects and each object in the third set of objects being characterized by the at least one attribute-value pair with a value that refers to the at least one object in the second set of objects, wherein the third set of objects includes at least one object distinct from the first subset of objects; and computing a second navigation state that refines the first navigation state, the second navigation state corresponding to a fourth set of objects from the plurality of objects, wherein each object in a subset of the fourth set of objects has at least one of the stored plurality of relationships as the value of attribute-value pair that refers to one or more objects in the third set of objects.

35. The method of claim 34, wherein a first facet-value pair is associated with the second set of objects and a second facet-value pair is associated with the third set of objects, and wherein the value of the first facet-value pair is a child of the value of the second facet-value pair.

36. The method of claim 34, wherein a first facet-value pair and a second facet-value pair are associated with the second set of objects, the first facet-value pair is associated with the third set of objects, and the second facet-value pair is not associated with the third set of objects.

* * * * *